United States Patent
Ikeda et al.

(10) Patent No.: US 7,421,094 B2
(45) Date of Patent: Sep. 2, 2008

(54) TRAFFIC LANE MARKING LINE RECOGNITION SYSTEM FOR VEHICLE

(75) Inventors: Tetsuo Ikeda, Saitama (JP); Kiyozumi Unoura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 11/596,898

(22) PCT Filed: May 17, 2005

(86) PCT No.: PCT/JP2005/008940

§ 371 (c)(1),
(2), (4) Date: Nov. 17, 2006

(87) PCT Pub. No.: WO2005/111966

PCT Pub. Date: Nov. 24, 2005

(65) Prior Publication Data

US 2008/0027627 A1    Jan. 31, 2008

(30) Foreign Application Priority Data

May 19, 2004    (JP) ............................ 2004-148580

(51) Int. Cl.
G06K 9/00 (2006.01)
G06K 9/32 (2006.01)
G01C 22/00 (2006.01)
H04N 7/18 (2006.01)

(52) U.S. Cl. ...................... 382/104; 382/294; 701/28; 348/119

(58) Field of Classification Search ................. 382/104, 382/284, 294; 348/119; 701/28, 116, 205
See application file for complete search history.

(56) References Cited

U.S. PATENT DOCUMENTS

| | | | | | |
|---|---|---|---|---|---|
| 5,359,666 | A | * | 10/1994 | Nakayama et al. | 382/104 |
| 5,555,312 | A | * | 9/1996 | Shima et al. | 382/104 |
| 6,091,833 | A | * | 7/2000 | Yasui et al. | 382/104 |
| 7,006,667 | B2 | * | 2/2006 | Akutagawa | 382/104 |

(Continued)

FOREIGN PATENT DOCUMENTS

JP      06-042261    2/1994

(Continued)

*Primary Examiner*—Colin LaRose
(74) *Attorney, Agent, or Firm*—Carrier, Blackman & Associates, P.C.; Joseph P. Carrier; William D. Blackman

(57) ABSTRACT

In the traffic lane marking line recognition system for vehicle having an image compositing device for compositing images photographed at different time points by a camera to elongate a traffic lane marking line in the photographed image, a fore-aft direction angle of the vehicle relative to the traffic lane marking line and a distance of the vehicle from the line in each of the images to be composited are detected to determine deviations of the angles and distances between the images; and the images are composited after having been corrected such that the angles and distances of the vehicle relative to the line are equal to each other based on the determined deviations of the angles and distances. With this, the traffic lane marking lines are elongated in appearance in the composited image due to the correction, thereby enabling accurate and unerring recognition of the traffic lane marking line.

8 Claims, 23 Drawing Sheets

U.S. PATENT DOCUMENTS

| | | | |
|---|---|---|---|
| 7,034,861 B2 * | 4/2006 | Okada et al. | 348/36 |
| 7,317,813 B2 * | 1/2008 | Yanagawa et al. | 382/104 |
| 2005/0031169 A1 * | 2/2005 | Shulman et al. | 382/104 |

FOREIGN PATENT DOCUMENTS

| | | |
|---|---|---|
| JP | 10-320559 | 12/1998 |
| JP | 2001-236506 | 8/2001 |
| JP | 2002-029348 | 1/2002 |
| JP | 2002-092796 | 3/2002 |
| JP | 2002-197469 | 7/2002 |
| JP | 2004-110521 | 4/2004 |

* cited by examiner

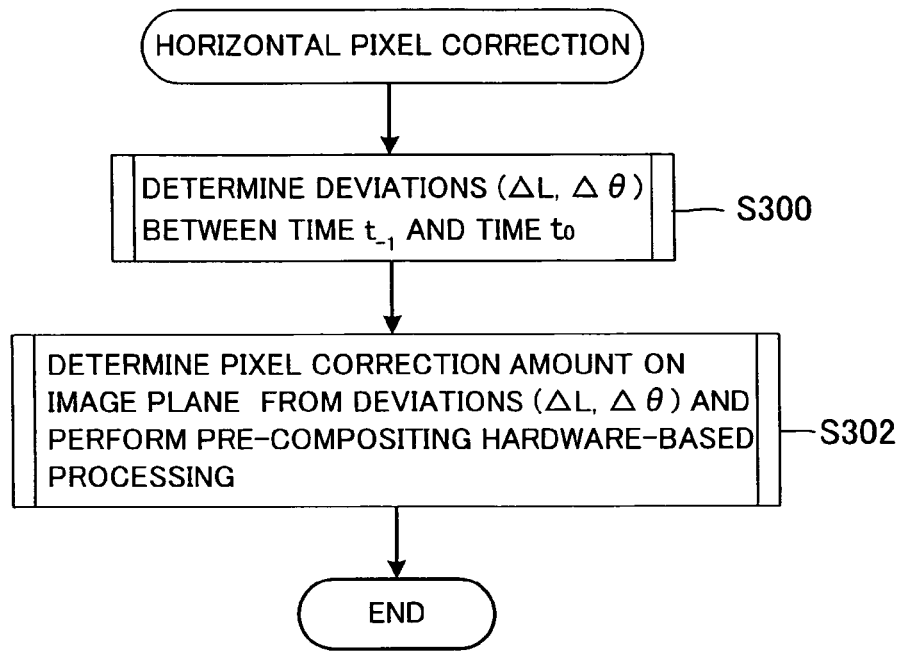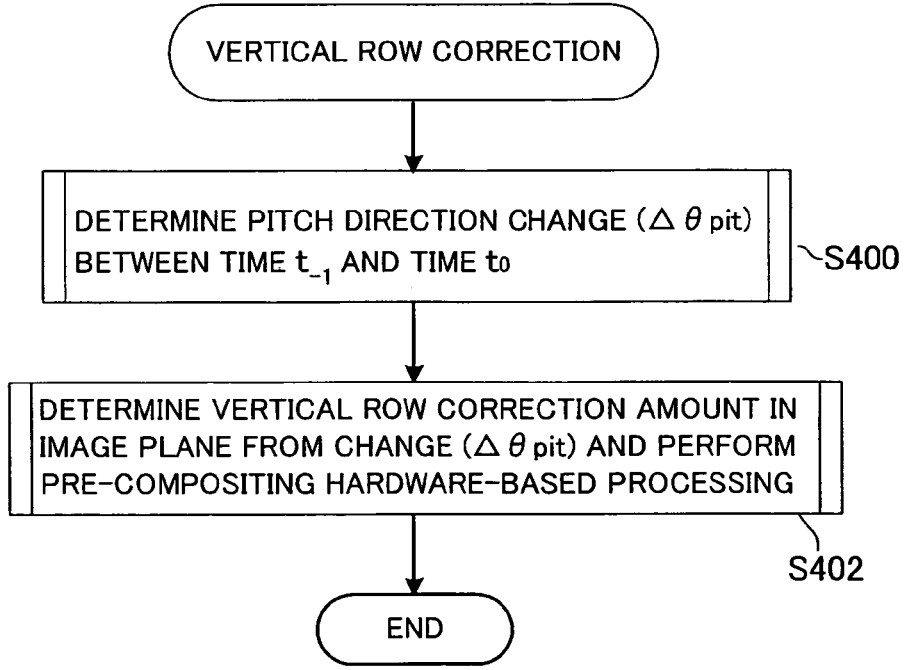

FIG. 21

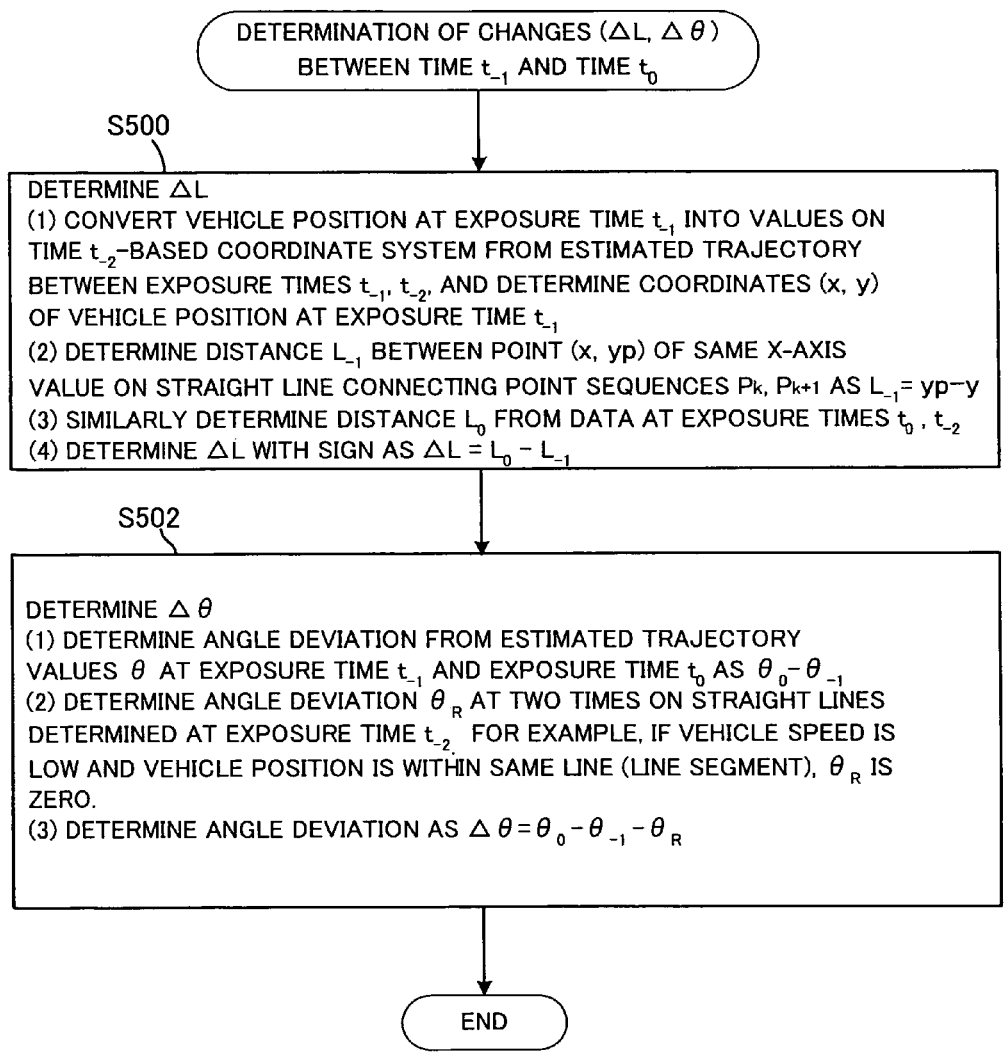

DETERMINATION OF CHANGES ($\Delta L$, $\Delta \theta$) BETWEEN TIME $t_{-1}$ AND TIME $t_0$

S500

DETERMINE $\Delta L$
(1) CONVERT VEHICLE POSITION AT EXPOSURE TIME $t_{-1}$ INTO VALUES ON TIME $t_{-2}$-BASED COORDINATE SYSTEM FROM ESTIMATED TRAJECTORY BETWEEN EXPOSURE TIMES $t_{-1}$, $t_{-2}$, AND DETERMINE COORDINATES (x, y) OF VEHICLE POSITION AT EXPOSURE TIME $t_{-1}$
(2) DETERMINE DISTANCE $L_{-1}$ BETWEEN POINT (x, yp) OF SAME X-AXIS VALUE ON STRAIGHT LINE CONNECTING POINT SEQUENCES Pk, Pk+1 AS $L_{-1}$ = yp−y
(3) SIMILARLY DETERMINE DISTANCE $L_0$ FROM DATA AT EXPOSURE TIMES $t_0$, $t_{-2}$
(4) DETERMINE $\Delta L$ WITH SIGN AS $\Delta L = L_0 - L_{-1}$

S502

DETERMINE $\Delta \theta$
(1) DETERMINE ANGLE DEVIATION FROM ESTIMATED TRAJECTORY VALUES $\theta$ AT EXPOSURE TIME $t_{-1}$ AND EXPOSURE TIME $t_0$ AS $\theta_0 - \theta_{-1}$
(2) DETERMINE ANGLE DEVIATION $\theta_R$ AT TWO TIMES ON STRAIGHT LINES DETERMINED AT EXPOSURE TIME $t_{-2}$. FOR EXAMPLE, IF VEHICLE SPEED IS LOW AND VEHICLE POSITION IS WITHIN SAME LINE (LINE SEGMENT), $\theta_R$ IS ZERO.
(3) DETERMINE ANGLE DEVIATION AS $\Delta \theta = \theta_0 - \theta_{-1} - \theta_R$

END

RELATIVE POSITION ON ACTUAL PLANE

TRAFFIC LANE MARKING LINE RECOGNITION SYSTEM FOR VEHICLE

CROSS-REFERENCE TO RELATED APPLICATIONS

The present application is a U.S. National phase of, and claims priority based on PCT/JP2005/008940 (published as WO 2005/111966 A1), filed May 17, 2005, which, in turn, claims priority from Japanese patent application 2004-148580, filed May 19, 2004. The entire disclosure of each of the referenced priority documents is incorporated herein by reference.

TECHNICAL FIELD

This invention relates to a traffic lane marking line recognition system for vehicle.

BACKGROUND ART

Road surfaces (roads) on which vehicles drive are marked or installed with various road markings such as white lines, yellow lines and cat's eyes constituting traffic lane marking lines. Conventionally the recognition of white lines and other such traffic lane marking lines has, as taught by Patent Reference 1, been done by subjecting an image photographed or taken by image photographing means such as a CCD camera and an image processing ECU to differentiation and binarization processing to detect edges in the image and subjecting point sequences of the detected edge (white line candidate point sequences) to Hough transformation to extract approximated linear components.

Further, when, for example, a white line marked on the road surface is itself physically worn through or partially chipped away, or the white line is indistinct in the photographed image owing to low contrast such as may occur during night driving, the white line cannot be accurately recognized, and, as set out in Patent Reference 2, a technique has been proposed for, in such a case, forming a window in the photographed image, judging the degree of white line wear-off from the density of the white line candidate points in the window, and when wear-off is found, superimposing/compositing a white line candidate point sequences extracted from a photographed image taken a given time earlier on/with the white line candidate point sequences extracted from the current white line image, determining a straight line approximating the composited white line candidate point sequences, and recognizing it as the white line.

Patent Reference 1: Japanese Patent Publication No. Hei 6(1994)-42261

Patent Reference 2: Japanese Laid-Open Patent Application No. 2001-236506

Now, cases arise in which the posture or angle of the vehicle with respect to a traffic lane marking line differs between the present time point and the earlier time point, so that the photographed images deviate or shift in the horizontal direction or the angular direction of the vehicle with respect to the traffic lane marking line between the two time points, which of course means that if the images are composited or synthesized as they are, an offset will occur in the images in the horizontal position and angle of the traffic lane marking line.

In order to prevent this, it is necessary to correct the horizontal position and angular direction of the traffic lane marking line in the image at the earlier time point by an amount corresponding to the change in the vehicle posture between the present and earlier time points. On this point, the prior art taught by Patent Reference 2 merely detects the amount of vehicle yaw rate change, i.e., presence/absence of vehicle rotation (turning) movement, and corrects the image in correspondence to the amount of turning, if any, so that no correction of the horizontal position is carried out and, therefore, there is a disadvantage in that the traffic lane marking line is not suitably elongated in the composite image. Recognition of the traffic lane marking line by image recognition naturally amounts to recognition of the course of travel (the vehicle's subject or own lane) and since the accuracy with which the direction of the traffic lane marking line is recognized improves with increasing length of the white line components of the traffic lane marking line, it is preferable to composite such that the traffic lane marking line is elongated in appearance.

Therefore, an object of this invention is to overcome the aforesaid drawbacks and provide a traffic lane marking line recognition system for vehicles configured such that the traffic lane marking line is elongated in appearance in the composited image corrected in accordance with the vehicle position (distance between the traffic lane marking line and vehicle) and angle, thereby enabling accurate and unerring recognition of the traffic lane marking line.

SUMMARY OF THE INVENTION

In order to achieve the object, according to a first aspect of the invention there is provided a system for recognizing a traffic lane marking line for a vehicle having image photographing means for photographing a range including a road surface in a direction of travel of the vehicle, traffic lane marking line recognizing means configured to be capable of recognizing at least a traffic lane marking line in a broken line on the road surface in a photographed image photographed by the image photographing means, image compositing means for compositing a plurality of images photographed at different time points by the image photographing means to elongate the traffic lane marking line in the photographed images, vehicle condition detecting means for detecting a fore-aft direction angle of the vehicle relative to the traffic lane marking line and a distance of the vehicle from the traffic lane marking line in the plurality of images to be composited or synthesized by the image compositing means and determining deviations of the angles and distances between the plurality of the images. The image compositing means composites the plurality of images, after correcting the plurality of images such that the angles and distances of the vehicle relative to the traffic lane marking line are equal to each other in the plurality of images based on the deviations of the angles and distances determined by the vehicle condition detecting means.

Further, according to a second aspect thereof, the invention is configured to have a system for recognizing a traffic lane marking line for a vehicle having image photographing means for photographing a range including a road surface in a direction of travel of the vehicle, traffic lane marking line recognizing means configured to be capable of recognizing at least a traffic lane marking line on the road surface having a broken line in a photographed image photographed by the image photographing means, image compositing means for compositing a plurality of images photographed at different time points by the image photographing means to elongate the traffic lane marking line in the photographed images; and vehicle condition detecting means for detecting a fore-aft direction angle of the vehicle relative to the traffic lane marking line and a distance of the vehicle from the traffic lane marking line in the plurality of images to be composited or synthesized by the image compositing means and determining deviations of the angles and distances between the plurality of the images; and the image compositing means composites the plurality of images, by adjusting a compositing position of the plurality of images, such that the angles and distances of the vehicle relative to the traffic lane marking line are equal to each other in the plurality of images based on the deviations of the angles and distances determined by the vehicle condition detecting means.

Further, according to a third aspect thereof, the invention is configured to further include: pitch angle change detecting means for detecting a pitch angle of the vehicle at each of the time points where the plurality of images are photographed to determine a change in the pitch angle in the images; and the image compositing means composites the plurality of images, after correcting the plurality of images such that the pitch angles are equal to each other in the plurality of images based on the change in the pitch angle determined by the pitch angle change detecting means.

Further, according to a fourth aspect thereof, the invention is configured to further include: pitch angle change detecting means for detecting a pitch angle of the vehicle at each of the time points where the plurality of images are photographed to determine a change in the pitch angle in the images; and the image compositing means composites the plurality of images, by adjusting a compositing position of the plurality of images, such that the pitch angles are equal to each other in the plurality of images based on the change in the pitch angle determined by the pitch angle change detecting means.

EFFECTS OF THE INVENTION

Since, according to the first aspect of the invention, the traffic lane marking line recognition system for vehicles is configured such that a fore-aft direction angle of the vehicle relative to the traffic lane marking line and a distance of the vehicle from the traffic lane marking line in the plurality of images to be composited are detected to determine deviations of the angles and distances between the plurality of the images; and the plurality of images are composited, after having been corrected such that the angles and distances of the vehicle relative to the traffic lane marking line are equal to each other in the plurality of images based on the determined deviations of the angles and distances, the traffic lane marking lines can be reliably elongated in appearance in the composited image, thereby enhancing the recognition accuracy of the traffic lane marking line to provide unerring recognition of the traffic lane of the subject vehicle.

According to the second aspect of the invention, the system is configured such that a fore-aft direction angle of the vehicle relative to the traffic lane marking line and a distance of the vehicle from the traffic lane marking line in the plurality of images to be composited are detected to determine deviations of the angles and distances between the plurality of the images, and the plurality of images are composited, by being adjusted its compositing position of the plurality of images, such that the angles and distances of the vehicle relative to the traffic lane marking line are equal to each other in the plurality of images based on the determined deviations of the angles and distances. Specifically, on the contrary to the system described above with respect to the first aspect of the invention, where the images themselves are moved, the plurality of images are composited, by adjusting a compositing position of the plurality of images, such that the angles and distances of the vehicle relative to the traffic lane marking line are equal to each other in the plurality of images based on the determined deviations of the angles and distances. With this, it becomes possible to obtain the same effects as mentioned in the first aspect of the invention.

Since, according to the third aspect of the invention, the traffic lane marking line recognition system for vehicles is configured such that a pitch angle of the vehicle at each of the time points where the images are photographed is detected to determine a change in the pitch angle in the images, and the images are composited after having been corrected such that the pitch angles are equal to each other, the traffic lane marking lines can be more reliably elongated in appearance in the composited image, thereby enhancing the recognition accuracy of the traffic lane marking line to provide unerring recognition of the traffic lane of the subject vehicle.

Since, according to the fourth aspect of the invention, the traffic lane marking line recognition system for vehicles is configured such that a pitch angle of the vehicle at each of the time points where the images are photographed is detected to determine a change in the pitch angle in the images, and the images are composited by being adjusted its compositing position of the images, such that the pitch angles are equal to each other, similarly to the above the traffic lane marking lines can be more reliably elongated in appearance in the composited image, thereby enhancing the recognition accuracy of the traffic lane marking line to provide unerring recognition of the traffic lane of the subject vehicle.

It should be noted that, the phrase "direction of travel of the vehicle" employed herein is used to mean not only the forward direction of the vehicle when traveling forward, but also to recognize the road surface behind the vehicle photographed by an image photographing means for photographing a range including the road surface behind the vehicle when the vehicle is traveling forward. Thus, the phrase "direction of travel of the vehicle" is used to mean the fore-aft direction of the vehicle.

BRIEF DESCRIPTION OF THE DRAWINGS

FIG. 19 is a subroutine flowchart of the horizontal pixel correction processing shown in FIG. 8;

FIG. 20 is a subroutine flowchart of the vertical row correction processing shown in FIG. 8;

FIG. 21 is a subroutine flowchart of the processing of FIG. 19;

DETAILED DESCRIPTION INCLUDING BEST MODE OF CARRYING OUT THE INVENTION

The best mode for implementing the traffic lane marking line recognition system for a vehicle according to this invention will be explained with reference to the attached drawings in the following.

FIRST EMBODIMENT

Figure 1:
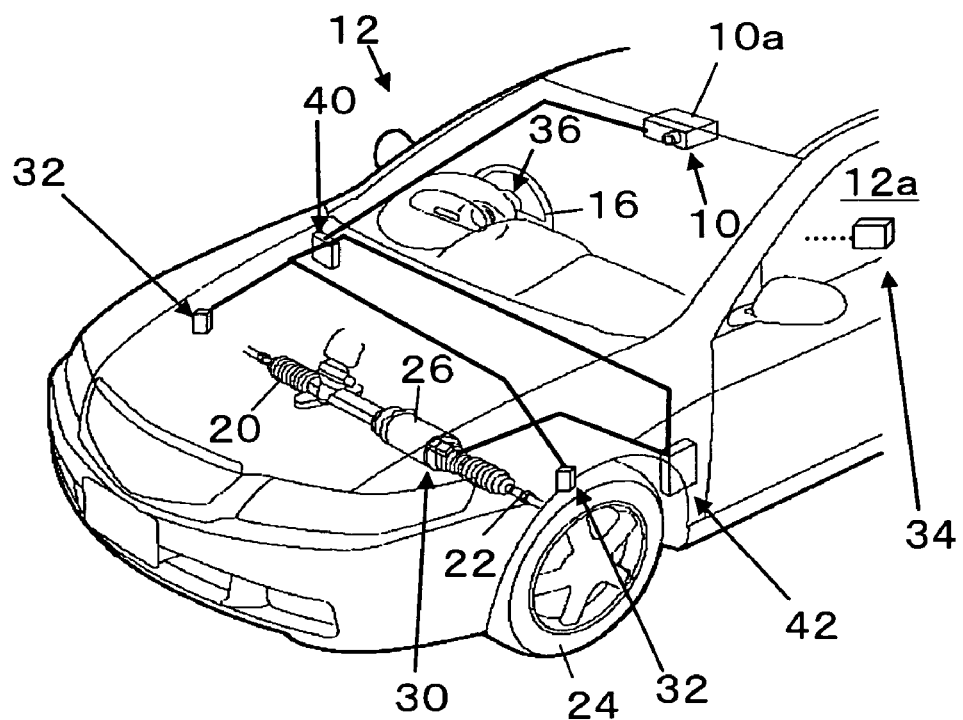
FIG. 1 is a schematic drawing showing the overall configuration of a traffic lane marking line recognition system for vehicle according to an embodiment of this invention.

FIG. 1 is a schematic drawing showing the overall configuration of a traffic lane marking line recognition system for vehicle according to an embodiment of this invention.

The symbol 10 in the drawing designates a camera equipped with an image pickup device such as a CCD, C-MOS or the like and mounted inside a passenger compartment 12a to face in the direction of travel of a vehicle 12, which camera 10 photographs a range including the road surface in the direction of travel of the vehicle 12. An image processing ECU (Electronic Control Unit) is accommodated in a case 10a of the camera 10. The image processing ECU inputs images (pictures) outputted from the camera 10 representing information on the lane forward of the vehicle and is equipped with a hardware-implemented image processing IC (Integrated Circuit) that performs image processing explained later. The camera 10 and the image processing ECU correspond to the aforesaid image photographing means.

Note that in this embodiment "traffic lane marking line" means a road marking for separating vehicle passageways (lanes), such as a solid or broken white or yellow line that is applied to the surface of the road by painting, or cat's eyes or the like installed at intervals on the road surface. A vehicle passageway partitioned by a traffic lane marking line or lines is called a "lane."

A steering wheel 16 installed at a driver's seat in the passenger compartment 12a of the vehicle 12 is connected to a rack shaft 20 through a rack-and-pinion type steering gear and the rack shaft 20 is connected to driven wheels 24 through tie rods 22. An electric power steering (EPS) mechanism 30 including an electric motor 26 is disposed on the rack shaft 20 and the rack shaft 20 is reciprocated by rotation of the electric motor 26.

The driven wheels 24 and the free wheels (not shown) each has a wheel-speed sensor (only two shown) 32 in the vicinity thereof that produces an output or signal once per predetermined angle of rotation, i.e., output indicative of the travel speed (vehicle speed) of the vehicle 12. A yaw rate sensor 34 is disposed at the middle of the vehicle 12 (near the rear axle) and produces an output or signal corresponding to the yaw rate (angular velocity) about the vertical axis (gravity axis) at the center of gravity of the vehicle 12. Further, a steering angle sensor 36 is provided near the steering wheel 16 and produces an output or signal corresponding to the amount of rotation of the steering wheel 16 manipulated by the driver, i.e., the steering angle.

A control ECU (Electronic Control Unit) 40 similarly equipped with a microcomputer is provided at a suitable location of the vehicle 12. The control ECU 40 inputs the outputs of the image processing ECU and the aforesaid sensors, calculates a steering force required for, inter alia, lane keep assist control for driving along the traffic lane or lane deviation prevention control for preventing unintentional deviation from the traffic lane, and converts it into command values to output. The control ECU 40 is connected to an EPSECU 42 that controls the operation of the EPS 30. The EPSECU 42 is also equipped with a microcomputer, exchanges data with the control ECU 40, and operates the electric motor 26 based on the command value outputted from the control ECU 40.

Figure 2:
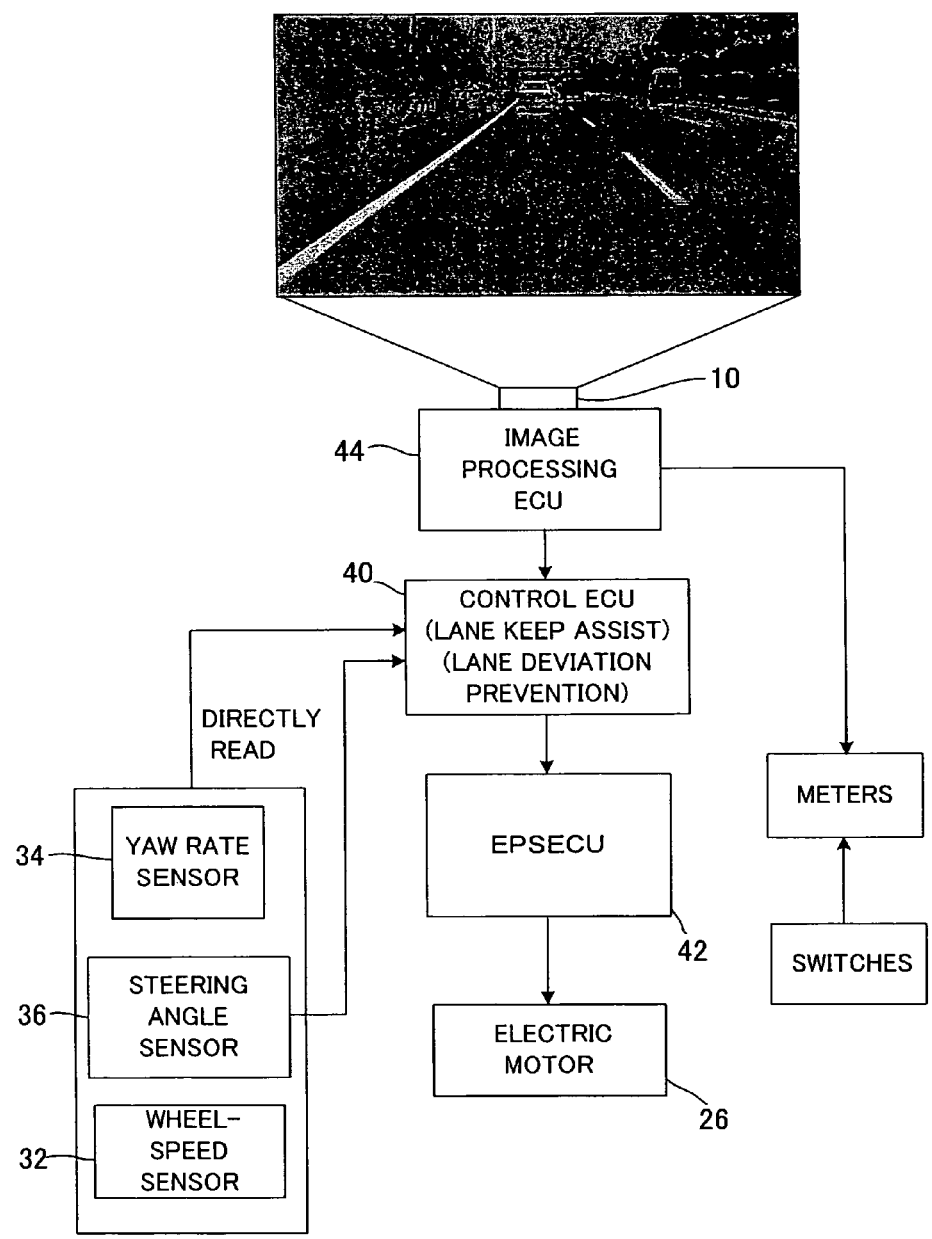
FIG. 2 is a block diagram showing the operation of a control ECU shown in FIG. 1 in terms of inputs and outputs.

FIG. 2 is a block diagram showing the operation of the control ECU 40 in terms of inputs and outputs.

As illustrated, the control ECU 40 inputs the output of the image photographing means composed of the camera 10 and the aforesaid image processing ECU (designated by symbol 44) and the output of the yaw rate sensor 34 etc., and outputs lane keep assist control and other command values to the EPSECU 42 by communication to operate the electric motor 26. Further, although omitted in FIG. 1, meters and switches (SW) are disposed near the driver's seat in the passenger compartment 12*a* and the particulars of the control performed by the control ECU 40 are displayed on the meters. Further, the driver's instructions to control are inputted through the switches to be displayed on the meters and also to the control ECU 40.

Figure 3:
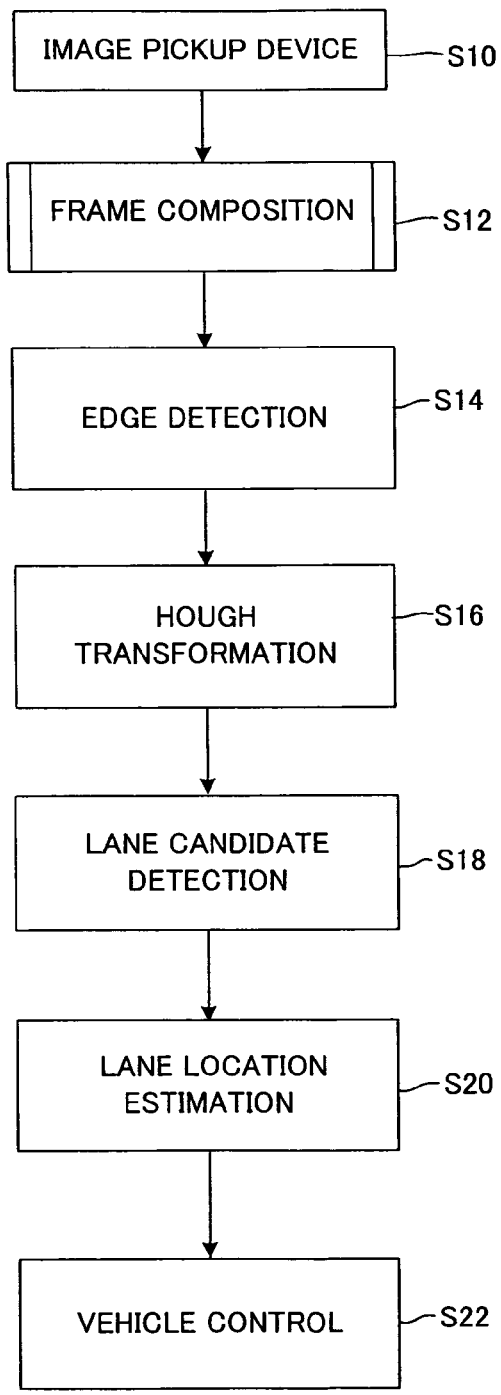
FIG. 3 is a flowchart showing the operation of the system shown in FIGS. 1 and 2.

FIG. 3 is a flowchart showing the operation of the system shown in FIGS. 1 and 2. The program shown in the drawing is executed in the image processing ECU 44 and control ECU 40 at predetermined time intervals of, say, 33 milliseconds.

This will be explained in the following: In step S10 ("step" is omitted hereinafter), the image pickup device of the camera 10 produces an image signal. The image pickup device of the camera 10 is provided with an imaging region made up of n rows vertical×m columns horizontal pixels. On the factory production line, for example, the camera 10 has its optical axis aligned in a predetermined direction including the traffic lane ahead.

Next, in S12, frame composition processing is conducted, i.e., the image signal outputted from the image pickup device is inputted and composited. Specifically, the image signal inputted in the current processing cycle and an image signal inputted and stored in the memory of the image processing ECU 44 in an earlier processing cycle, in other words, the current image (frame) and a past image (frame) are composited. Note that since features that characterize this embodiment reside in the frame composition, this will be explained in detail below. Processing from S12 to S16 is performed by the hardware-implemented image processing IC in the image processing ECU 44.

Figure 4:
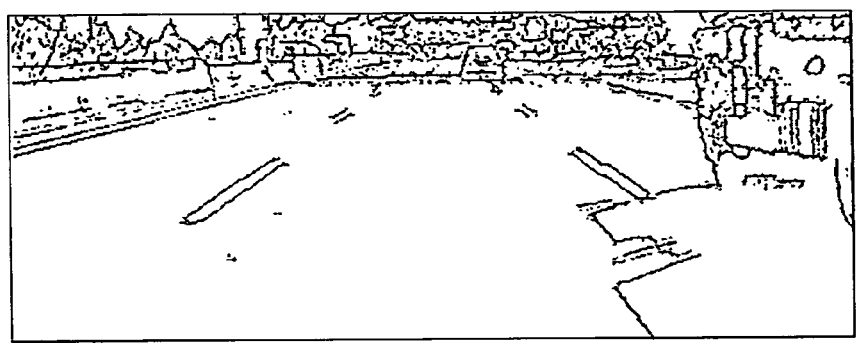
FIG. 4 is an explanatory view showing an edge image obtained by edge detection processing shown in FIG. 3.
Figure 5:
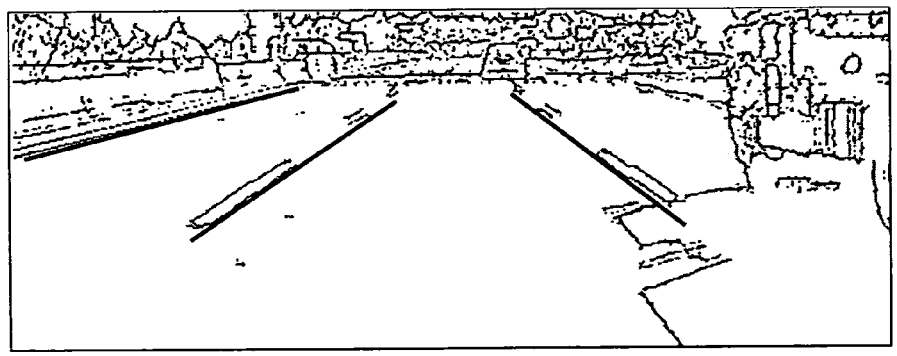
FIG. 5 is an explanatory view showing guidelines, i.e., linear components corresponding to a white line or other such traffic lane marking lines, which are obtained by Hough transformation processing shown in FIG. 3.

Next, in S14, edge detection processing including well-known differentiation processing and ensuing binarization processing is conducted to produce from the inputted image an edge image like that shown in FIG. 4, and next, in S16, linear components (shown by solid lines in FIG. 5) corresponding to white line or other such traffic lane marking lines are discriminated by similarly well-known Hough transformation.

Figure 6:
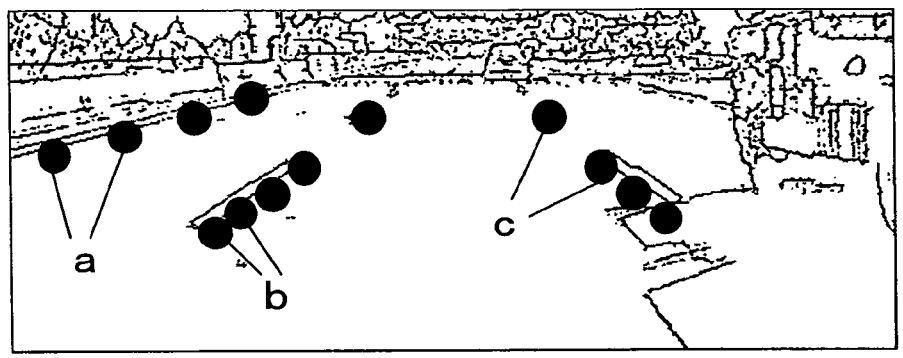
FIG. 6 is an explanatory view showing lane candidates (white line candidate point sequences) determined by lane candidate detection processing shown in FIG. 3.

Next, in S18, as shown in FIG. 6, a plurality of edge points (edge point sequences; indicated as black bullets in the drawing) running along the linear components are detected as lane candidates (white line candidate point sequences).

Figure 7:
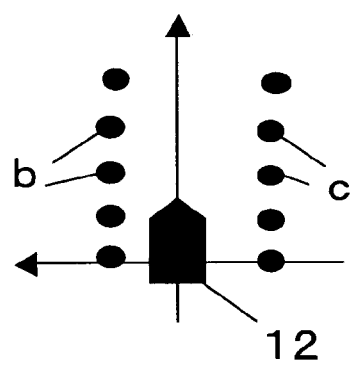
FIG. 7 is an explanatory view showing an estimated location of a travel lane of a subject vehicle determined by travel lane location estimation processing shown in FIG. 3.

Next, in S20, when a plurality of candidates are present as lane candidates (e.g., when, as shown in FIG. 6, three point sequences a, b and c are present), which candidate among the multiple lane candidates represents the travel lane of the subject vehicle (vehicle 12) is discriminated from the positional relationship between the subject vehicle (vehicle 12) and the lane candidates, and the location of the travel lane of the subject vehicle is estimated as shown in FIG. 7.

Next, in S22, vehicle control is implemented. That is, based on the estimated lane location, the command value for vehicle control, such as the aforesaid lane keep assist control or lane deviation prevention control, is outputted to the EPSECU 42 to control the operation of the electric motor 26. Note that the processing of S12 to S16 is performed by the aforesaid hardware-implemented image processing IC in the image processing ECU 44, the processing of S18 and S20 by the image processing ECU 44, and the processing from S22 onward by the control ECU 40.

Figure 8:
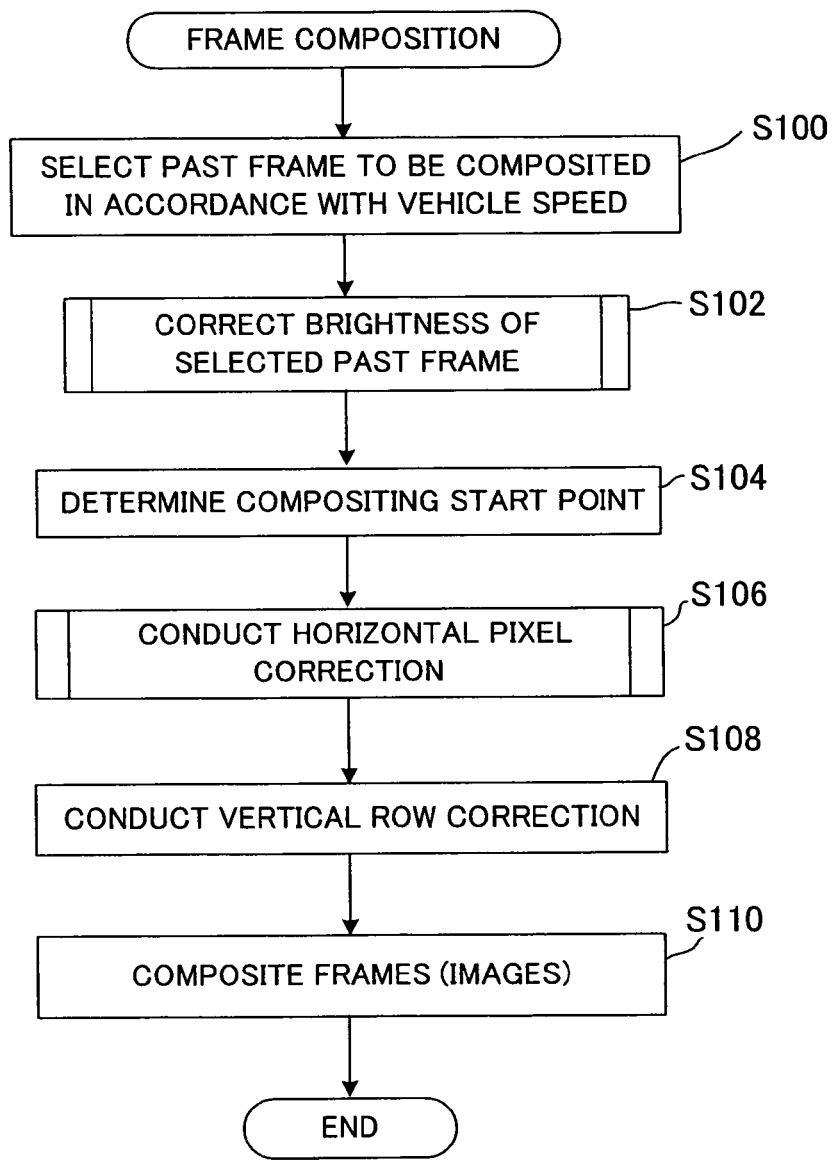
FIG. 8 is a subroutine flowchart showing frame composition processing shown in FIG. 3.

FIG. 8 is a subroutine flowchart showing the frame composition processing of S12 in FIG. 3 (frame compositing of the currently acquired image (photographed image signal) and an image (photographed image signal) acquired and memorized at an earlier point in time).

The characterizing features of this embodiment reside in the various frame composition shown in FIG. 8. Giving first a general explanation with reference to this drawing, in S100 the earlier or past frame to be composited is selected in accordance with the detected vehicle speed.

That is, the image to be composited with the photographed image inputted at the present time (current processing cycle) t (shown in FIG. 9) is selected from among the multiple photographed images inputted in every earlier processing cycle and stored in the memory of the image processing ECU 44. Specifically, a photographed image, like that shown in FIG. 10, that was photographed and memorized at time $t_{-n}$ is selected in accordance with the vehicle speed. Here, n means a discrete system sampling time, and $t_{-n}$ denotes an image photographed and inputted n cycles earlier, i.e., denotes an image photographed and stored at a different time point in the past.

In the ensuing S102, brightness correction of the selected earlier or past frame is conducted. That is, the photographed image inputted at the present time and the image photographed at an earlier time point and selected in accordance with the vehicle speed in S100 were photographed at different time points, meaning that the brightness of the photographed object (road surface) may differ owing to the effect of shading and the like and that if composition should be conducted in a state where the brightness of the road surface portion of one image is brighter than that of the white lines or other such traffic lane marking lines of the other image, there would be a risk of the white lines being buried in the road surface in the composited image, and therefore, in order to prevent this, processing is performed to match the brightness of the image photographed at the earlier time point with the brightness of the image photographed at the present time point such that the brightness of the images at the present and earlier time points are made equal. Note that the details thereof will be explained below.

In S104, the composition start point is determined. That is, it may happen that the posture of the vehicle 12 differ from the initial camera parameter conditions (at the time of the optical axis alignment of the camera 10) owing to vehicle loading or some other cause; in other words, a posture change may occur in the static pitching direction. As this posture change may vertically shift the photographic range of the camera 10, the composition start (reference) point is learned and corrected (determined) to take the amount of this shift into account at the time of image composition. Since the region above the road surface is ordinarily not needed for traffic lane marking line recognition, this processing is performed by bringing the positions of the horizons at the present and earlier time points into registration.

Next, in S106, horizontal pixel correction is conducted. That is, depending on the image-photographing time points, the posture and angle of the vehicle 12 relative to a lane may differ between the present and earlier time points, so that cases may arise in which offset occurs by the amount of such position and/or angle. In such a case, if the images are composited as they are, the horizontal position and angular direction of the traffic lane marking line will of course also shift. In order to prevent this, the horizontal position and angular direction of traffic lane marking line in the image photographed at the earlier time point is corrected by an amount proportional to the change in vehicle posture between the present and earlier time points. Note that the details thereof will be explained below.

Next, in S108, vertical row correction is conducted. That is, it is conceivable that the pitching condition of the vehicle 12 may differ between the present and earlier time points, so the dynamic pitch angle variation between the two time points is determined from the change in the position of the horizon found from the images, and the vertical (up/down) direction in the image is corrected to obtain a corrected image like that shown in FIG. 11. This will also be explained below. Note that, in contrast to S104, in which the static shift in the pitch is corrected, in S108 it is the dynamic shift thereof that is corrected.

Figure 9:
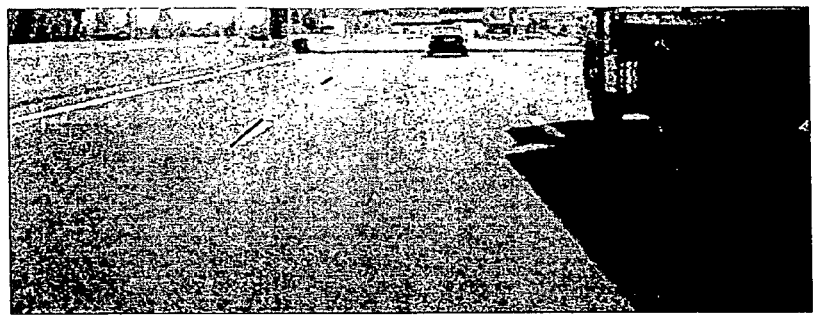
FIG. 9 is an explanatory view showing a photographed image inputted at the present time (current processing cycle) t that is to be a basis in past frame selection processing shown in FIG. 8.
Figure 10:
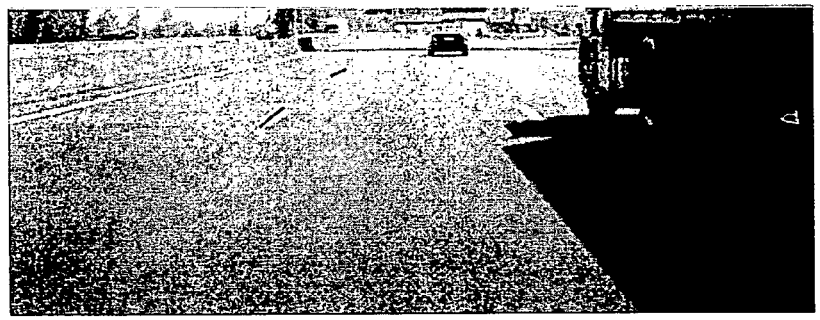
FIG. 10 is an explanatory view showing a photographed image inputted at the time $t-_n$ (earlier processing cycle) to be composited with the photographed image inputted at the present time (current processing cycle) t in the past frame selection processing shown in FIG. 8.
Figure 11:
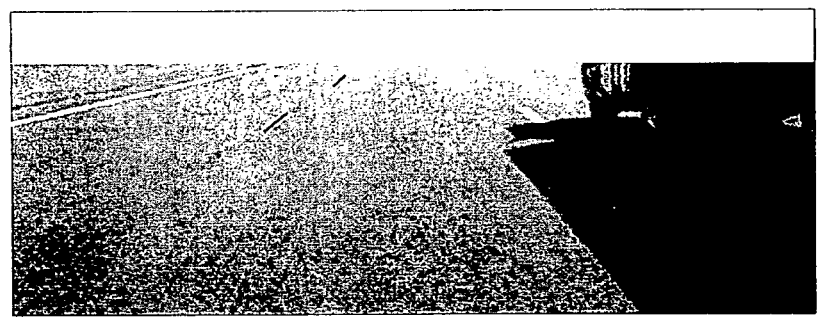
FIG. 11 is an explanatory view showing a corrected image in vertical row correction processing shown in FIG. 8.
Figure 12:
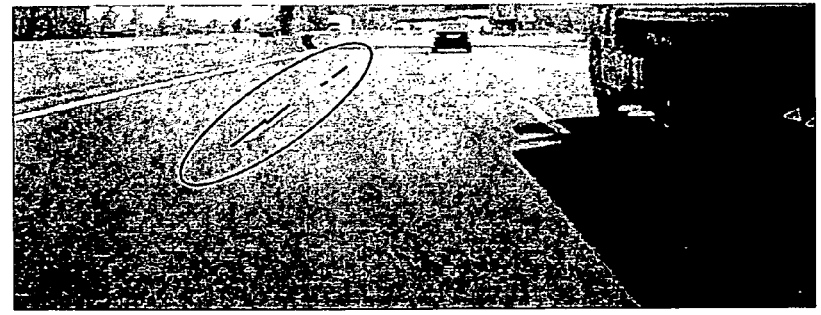
FIG. 12 is an explanatory view showing a composited image obtained by composition processing shown in FIG. 8.

Next, advancing to S110, the present time point's and corrected earlier time point's photographed images are composited to obtain an image wherein, as shown in FIG. 12, the white lines and other such traffic lane marking lines elongated to a greater length, in appearance, than in the images photographed at either of the two time points, as is evident from a comparison with FIGS. 9 to 11. This completes the frame composition processing shown in FIG. 8.

The features characterizing this embodiment will be successively explained in the following; the first characterizing feature is, as has been explained regarding S100 in FIG. 8, that the past frame to be composited is selected in accordance with the vehicle speed (driving speed).

This will be explained in the following: In the prior art of Patent Reference 2, the earlier image to be composited with the present image is an image photographed a given time earlier. However, the travel distance of the vehicle 12 differs with the vehicle speed (driving speed), which of course means that the photographic range of the camera (image pickup device) 10 similarly moves in the forward direction, so that the positions of traffic lane marking lines in the image also move with travel of the vehicle 12; in other words, the higher the vehicle speed, the greater is the movement of the photographed traffic lane marking line positions. Therefore, the amount and rate by which the traffic lane marking lines are elongated in the composited image differs depending on after how much of a time interval the earlier image is selected and composited with the present image.

Regarding traffic lane marking lines, there are known ones of broken line configuration composed of periodically repeated white line segments (colored segments) and blank (uncolored segments of asphalt or the like). From the aspect of durability, the white line segments of such a traffic lane marking line sometimes wear through or partially chip away, and in some cases, the white line segments are temporarily painted short in length as a stopgap measure during construction work or for other such reason.

Further, while only natural, recognition of traffic lane marking lines by image recognition amounts to driving lane (subject vehicle lane) recognition, and since the direction of the traffic lane marking line can be recognized more accurately in proportion as the length of the white line segments of the traffic lane marking lines is longer, composition is preferably done so as to elongate the white line segments in appearance, irrespective of presence/absence of the aforesaid white line segment wear and chipping. Taking this point into account, in this embodiment the image concerned is selected from among images (past frames) photographed earlier by a time interval determined in accordance with the vehicle speed (driving speed). Note that this is not limited to white lines but is also the same for yellow lines.

In view of what the inventors learned empirically, it is possible to recognize traffic lane marking lines with good accuracy and recognize the subject vehicle's traffic lane unerringly provided that the length of (proportion accounted for by) the white line segments relative to the total length of the white line segments and blanks of the traffic lane marking lines is equal to or greater than around 30%. The length of an elongated white line segment varies in accordance with the vehicle speed as mentioned earlier, and, therefore, the determination as to how many frames earlier in the image-photographing cycle should be used is made in accordance with the controlled speed range of the vehicle control systems that utilize recognized traffic lane marking line data, including, inter alia, the lane keep assist control or lane deviation prevention control discussed at the beginning of the specification.

Specifically, the image-photographing cycle is 33.3 milliseconds, so that if the vehicle speed (driving speed) is 60 km/h or faster, for example, it suffices to use the image three frames earlier to secure the required amount of white line segment elongation. Even at the image two frames earlier, a vehicle speed of 90 km/h or faster suffices, although the amount of white line segment elongation will be somewhat insufficient, and even in the vehicle speed range of 60-90 km/h, the amount of white line segment elongation decreases but the length elongated is 1 meter or greater and the proportion of the total length accounted for by the white line segments also increases to about 30%, so that the traffic lane marking lines can be recognized with good accuracy to enable the traffic lane of the subject vehicle to be reliably recognized.

Therefore, at least one photographed image taken in the cycle matching the time interval determined in accordance with the detected vehicle speed (driving speed) is selected as the photographed image to be composited with a given (present) photographed image. Note that it is also possible to switch the image used in the composition to two frames earlier or three frames earlier with the vehicle speed value imparted with hysteresis at, for example, 105 km/h or 110 km/h, or, if the vehicle speed is 60 km/h or greater, to use only the image three frames earlier, because when using the image three frames earlier, the length of the white line segments relative to the total length of the white line segments and blanks of the traffic lane marking line becomes 30% or greater.

Thus, in this embodiment the time of taking a given photographed image among the photographed images (specifically, the present image, still more specifically, the image photographed in the current traffic lane marking line recognition processing cycle) is defined or determined as the reference, and with respect to the given photographed image, there is selected as the photographed image to be composited with the photographed image at least one photographed image taken earlier by a time interval determined in accordance with the detected vehicle speed (driving speed) (more specifically, at least one photographed image taken in the cycle corresponding to the time interval determined in accordance with the detected vehicle speed (driving speed)), so that, irrespective of how high or low the vehicle speed is, it becomes possible to optimally determine the amount of apparent elongation of the white line segments of the traffic lane marking lines or the elongation ratio thereof and to enhance the recognition accuracy of the traffic lane marking lines to enable unerring recognition of the traffic lane of the subject vehicle.

Further, a configuration is adopted such that there is selected at least one photographed image taken earlier by a time interval that is longer in proportion as the detected vehicle speed is lower. That is, since the travel distance of the vehicle 12 becomes shorter with decreasing vehicle speed, an image photographed or inputted and memorized at a time point farther in the past is selected when the vehicle speed is low such that the amount of elongation or the elongation rate of the length of the traffic lane marking lines in the image after composition will not be insufficient. On the other hand, since the travel distance of the vehicle 12 becomes longer with increasing vehicle speed, an image photographed or inputted and memorized at an earlier time point near the present time point is selected.

Further, there is selected at least one photographed image taken earlier by a time interval such that the length of the colored segments relative to the total length of the white line segments (colored segments) and blanks (uncolored segments) of the traffic lane marking lines is equal to or greater than 30%, so that even when the traffic lane marking lines are worn through or chipped away, or short in length because of construction work or the like, it becomes possible to optimally determine the amount of apparent elongation of the white line segments of the traffic lane marking lines or the elongation ratio thereof and to enhance the recognition accuracy of the traffic lane marking lines to enable unerring recognition of the traffic lane of the subject vehicle.

Further, the image on which the composition is based is made an image photographed in the current traffic lane marking line recognition processing cycle, so that image composition can be performed based on up-to-date information. Further, there is selected at least one photographed image taken in the cycle corresponding to the time interval determined in accordance with the detected vehicle speed, so that image composition can similarly be performed based on up-to-date information.

In this embodiment, the second characterizing feature is, as is explained regarding S102 in FIG. 8, that brightness correction of the selected past frame is conducted.

Figure 13:
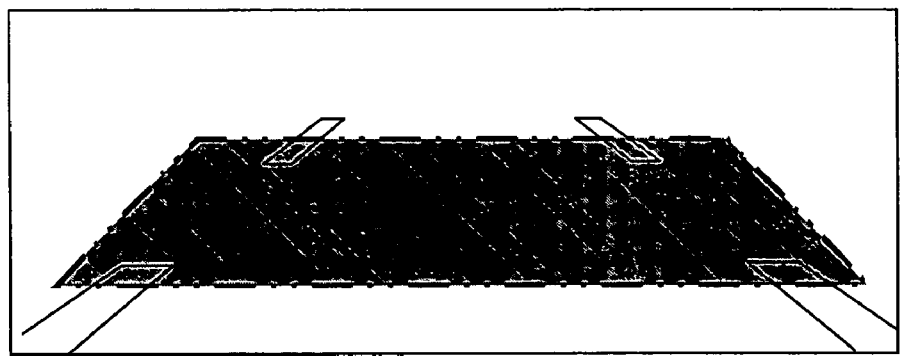
FIG. 13 is an explanatory view showing a predetermined region (road surface) of photographic range, which is to be detected by past frame brightness detection processing shown in FIG. 8.

This will be explained: In order to recognize the white line segments of the traffic lane marking lines with good accuracy, ordinarily, as shown in FIG. 13, the brightness of a predetermined region (road surface; hatched region in FIG. 13) of the photographic range of the camera 10 is detected, the shutter speed and/or iris are adjusted based on the detected brightness so as to enable clear detection of the white line segments and, in addition, the photographed image signal output amplifier gain and various photographic conditions are adjusted as necessary.

Note that in this specification "brightness" is used in the meaning of including all photographic conditions and the like, including brilliance, luminosity, density, and shutter speed, iris and image signal output amplifier gain and the like adjusted in accordance with the detected image brightness.

In normal driving conditions, the brightness of the road surface changes from moment to moment because of the effect of various environmental changes, such as the shadows of buildings etc., wetting of the road surface, and strong sunshine. The aforesaid adjustment of photographic conditions is conducted for clearly detecting the white line segments despite these brightness differences.

Consideration is now given to the compositing of the present and earlier images in the case where the road surface brightness differs at the image-photographing time points. Since the white line segments are brighter than the remaining road surface (asphalt, concrete) in the same image, at the time of compositing, the brighter at the same point in the image (same location) is assumed to be a white line segment and composition is conducted by selecting it.

As mentioned above, the shutter speed and the like are adjusted based on the detected brightness to make the brightness between the photographed images the same, but when variations of light and shade actually occur on the road surface, the shutter speed, iris and amplifier gain are not changed in one stroke but, for preventing hunting and other reasons, are gradually changed, with the result that brightness does not become the same between the photographed images but becomes somewhat different, so that cases arise in which the white line segments in one photographed image become darker than the road surface (asphalt portions) in the other photographed image.

Figure 14:
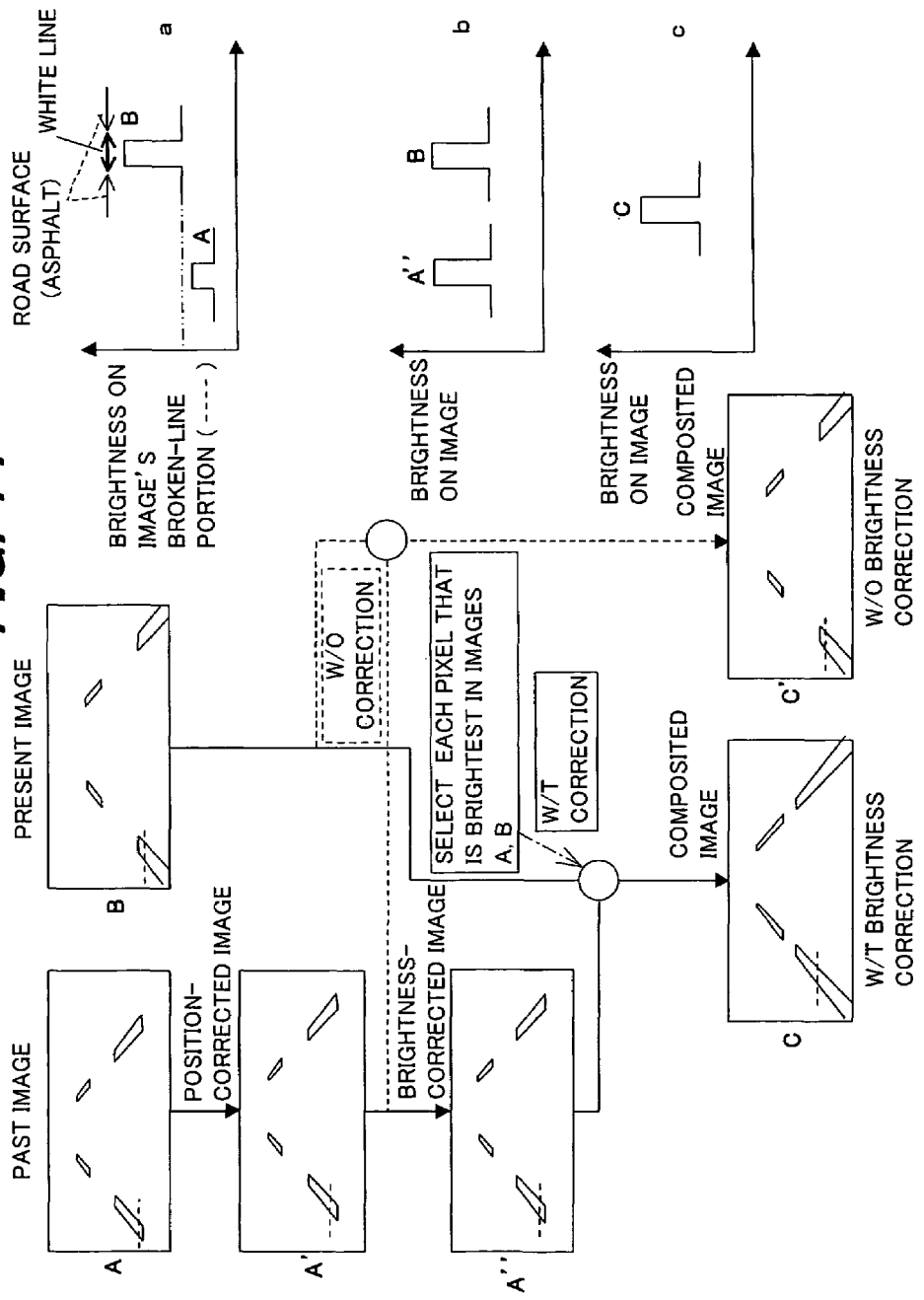
FIG. 14 is an explanatory view showing the past frame brightness detection processing shown in FIG. 8.

FIG. 14 is an explanatory view showing image brightness correction processing in this embodiment. Note that the three graphs marked a, b, c shown on the right side of the drawing are diagrams schematically indicating the brightnesses of the locations of the white line segments and road surface (asphalt) designated by broken lines in the images on the left side of the drawing. The annotation above graph a in the drawing indicates that the projecting part of the pulse-like waveform is the white line segment and the parts on opposite sides thereof the road surface. Therefore, graph a in the drawing shows that in the images A, B on the left side, the road surface of B is brighter than the white line segment of A.

A in FIG. 14 is an image photographed and memorized at an earlier time point, and B is the image photographed at the present time point. As shown by graph a on the right, the brightnesses of the images are such that the road surface of image B is brighter than the white line segment of image A (broken-line portion in the figure). As explained below, in this embodiment, as shown at A' of FIG. 14, position correction of the images is conducted in accordance with the change in the vehicle position between the present time point and the earlier time point.

At this time point, there is no change between A and A', and if at this stage, as indicated by the broken line with accompanying remark "W/O CORRECTION" in FIG. 14, the two images are composited, then, as indicated by the graph a on the right, the road surface portion of image B comes to be selected because the road surface (asphalt) of image B is brighter than the white line segment of image A, which gives rise to the disadvantage that the image becomes like the image in C' of FIG. 14 in which the white line segment of image A (A') has disappeared.

In view of this point, in this embodiment the brightness of the photographed image is detected from the brightness or the like of a predetermined road surface region in the photographic range (hatched region in FIG. 13) and, taking one image among a plurality of photographed images as the reference, correction is carried out so as to make the brightness the same in the plurality of photographed images. In this case, the brightness can actually be detected or be detected expediently. Specifically, the brightness ratio of the two images is determined from the photographic conditions when the images were taken at the earlier time point and the present time point and using the result to make the brightness of the two images the same, thereby eliminating the aforesaid disadvantage. Note that the brightness of the composited images can also be made equal by using the brightness difference rather than the ratio.

Figure 15:
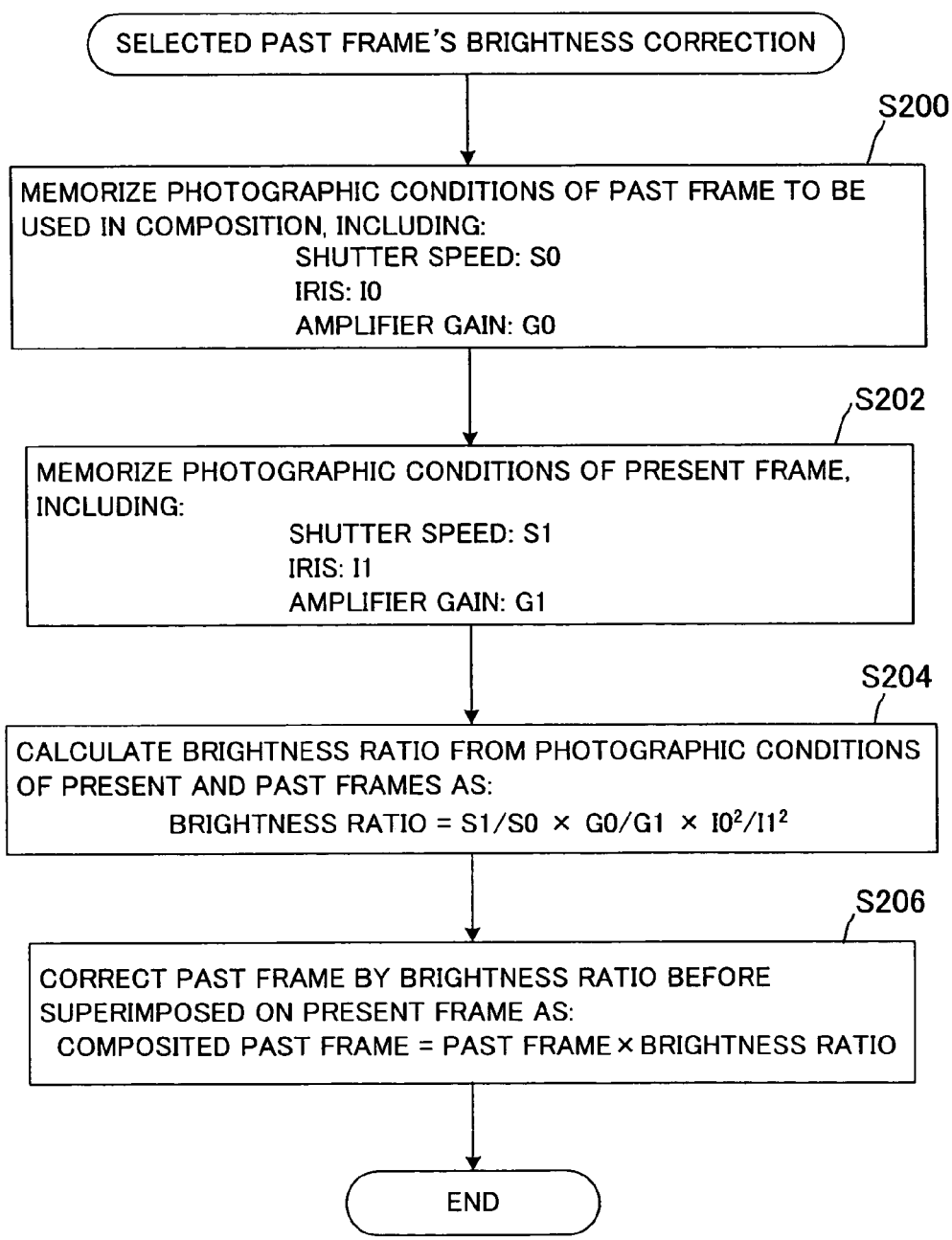
FIG. 15 is a subroutine flowchart of brightness correction processing shown in FIG. 8.

FIG. 15 is a subroutine flowchart of the brightness correction processing of S102 of FIG. 8.

This will be explained in the following: First, in S200, S202, the photographic conditions at the time of image-photographing, i.e., the photographic conditions comprising the shutter speeds S0, S1, irises I0, I1 and amplifier gains G0, G1 indicative of the image signal amplification factors are memorized. The detected photographed image brightness, specifically the brightness of a predetermined region of the road surface (hatched region in FIG. 13) in the photographic range of the image photographing means, is detected from the pixel density or the like of the region, and the shutter speed is determined (defined) based on the detected road surface brightness in accordance with the characteristic shown in FIG. 16, such that the sensitivity of the image pickup device (pixels) of the camera 10 is adjusted.

Figure 16:
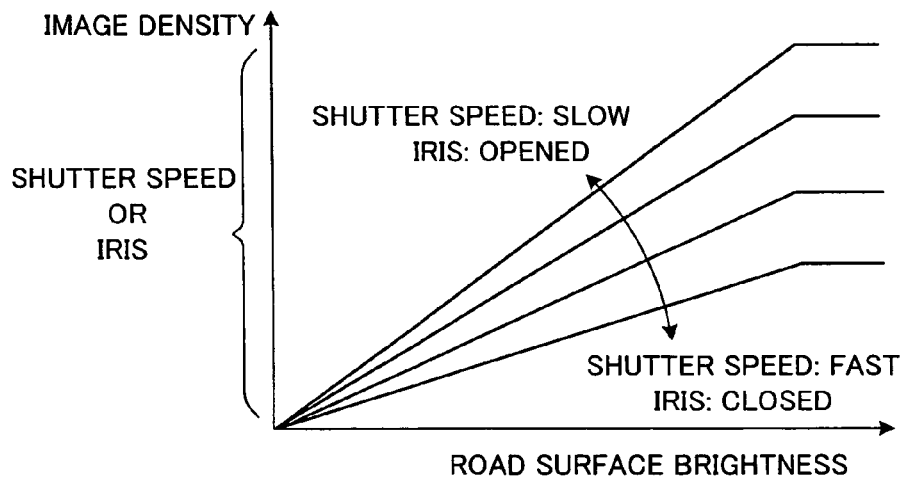
FIG. 16 is an explanatory view showing characteristics of shutter speeds and irises with respect to the brightness of road surface, used in the processing of FIG. 15.
Figure 17:
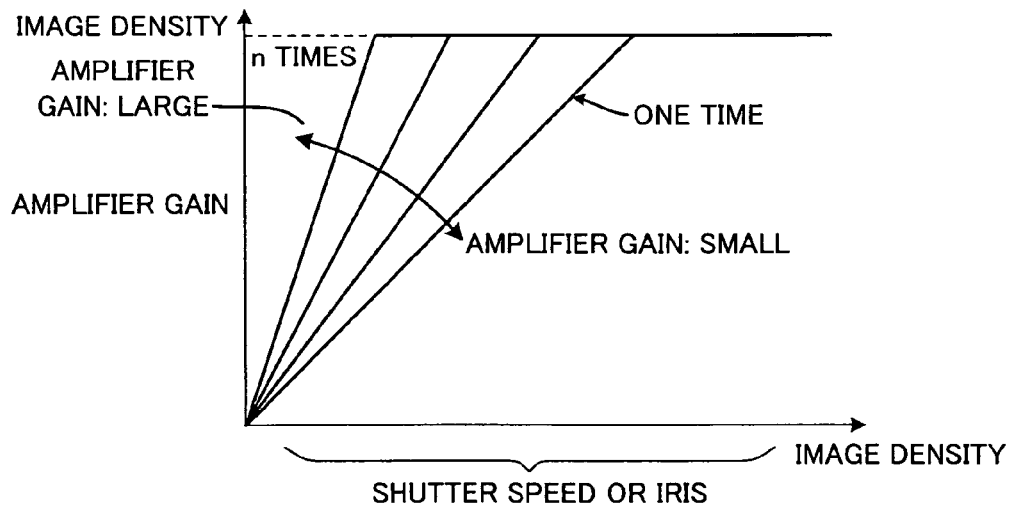
FIG. 17 is an explanatory view showing characteristics of amplifier gains with respect to the shutter speeds and irises, used in the processing of FIG. 15.

Note that, as is well known, image brightness can be adjusted also by the iris adjustment because it varies the amount of light taken in, as shown in FIG. 16. Further, when the ambience is dark and the image density adjusted by one or both of the shutter speed and iris is still insufficient, the brightness can be adjusted by the amplification factor n of the amplifier gain. It is with this in mind that in S200, S202 the iris and amplifier gain are also stored in memory in addition to the shutter speed.

Next, in S204, the brightness ratio between the present time point and earlier time point images is calculated based on the memorized photographic condition using the equation shown there, and in S206, the brightness of the earlier time point image is multiplied by the calculated brightness ratio to carry out correction for making the brightness of the earlier time point image the same as the brightness of the present time point image.

More specifically, the brightness ratios of a plurality of photographed images are detected based on at least one of the shutter speed and iris and the brightness is corrected based on at least one of the ratio and difference of one or both of the shutter speed and iris at the image-photographing time point of each of the photographed images, more specifically, based on both ratios thereof. Further, the brightness ratios of the multiple photographed images are also detected based on the amplification factors.

Regarding the brightness, note that the brightness of the predetermined region of the road surface indicated by the hatched region in FIG. 13 is detected from the pixel density of the region, and the detected brightness is corrected based on at least the respective ratios of the shutter speeds and irises at the image-photographing time points of the determined multiple photographed images.

As a result, in the processing of S110 of FIG. 8, an earlier time point image corrected in brightness and the present time point image are composited. Note that in the processing of S110, because the white line or other such traffic lane marking line is ordinarily brighter than the surrounding asphalt or other such road surface, at the time of composition there is selected from among the multiple images to be composited one whose pixels constituting the same area (given area) among multiple areas are brighter in brightness, i.e., that is brighter at the individual pixel level.

When the brightness is corrected by this processing, then, as shown by graph b on the right side of FIG. 14, the brightnesses of the road surface in the earlier time point image (broken line portion of image A" of FIG. 14) and in the present time point image (broken line portion of image B of FIG. 14) become the same. Therefore, as shown in C of FIG. 14, when the two images are composited, the white line segment is not buried in the road surface and there can be obtained an image wherein the white line segment is suitably elongated.

As set out in the foregoing, this embodiment is configured to detect the brightnesses of the photographed images photographed by the image photographing means, to perform correction to make the brightness in multiple photographed images the same, taking one image among the multiple photographed images as the reference, and, after the brightness has been corrected, to composite the multiple images, whereby, as a result of the brightness of the two images being the same, the white line segment in one of the images at the earlier time point and present time point does not become buried in the road surface of the other image and the white line segment can be favorably elongated. Therefore, the traffic lane marking line recognition accuracy can be enhanced and the traffic lane of the subject vehicle can be reliably recognized.

Further, since the image constituting the reference for composition is the image of the current traffic lane marking line recognition processing cycle, the images can be composited while making brightness equal based on up-to-date information to achieve improved traffic lane marking line recognition accuracy, thereby enabling reliable recognition of the subject vehicle's traffic lane. Further, by detecting the brightness of a predetermined region of the road surface, the brightness detection can be performed using a common yardstick to improve the traffic lane marking line recognition accuracy.

Further, brightness detection and correction are simple because the brightness detection and correction are performed based on at least one of the ratio and difference of one or both of the shutter speed and iris at the image-photographing time point of each of the multiple photographed images and on the amplifier gain (amplification factor). Since the correction is made so as to make the brightnesses equal at the same location in multiple images, the brightness can be corrected with still better accuracy.

Further, a configuration is adopted wherein multiple photographed images are composited by selecting from among the pixels constituting the same area of the multiple images that is brighter in brightness, and therefore, the traffic lane marking line can be still more accurately recognized from the composited image, whereby the traffic lane of the subject vehicle can be recognized still more reliably.

In this embodiment, the third characterizing feature is, as is explained regarding S1106 and S108 in FIG. 8, that horizontal pixel correction and vertical row correction are conducted.

This will be explained: The posture (angle) of the vehicle 12 relative to the traffic lane marking line and the distance to the traffic lane marking line in the horizontal direction sometime differ between the present time point and earlier time point, so that the angular direction of the vehicle 12 with respect to the horizontal direction and traffic lane marking line is shifted between the images photographed at the two time points, which of course means that if the images are composited as they are, an offset condition will occur in the horizontal position and angle of the traffic lane marking line.

In order to prevent this, it is necessary to correct the horizontal position and angular direction of the traffic lane marking line in the image at the earlier time point by an amount corresponding to the change in the vehicle posture between the present and earlier time points, and further, since it is conceivable that the pitching condition of the vehicle 12 may differ between the present time point and earlier time point, it is necessary to determine the pitch angle change between the two time points from the change in the horizon position and the like obtained from the images and correct vertical direction position in the images.

On this point, the prior art taught by Patent reference 2 merely detects the amount of vehicle yaw rate change, i.e., presence/absence of vehicle rotation (turning) movement, and imparts correction to the image in correspondence to the amount of rotation movement, if any, so that no correction of the horizontal position is carried out and, therefore, there is a disadvantage in that the traffic lane marking line is not suitably elongated in the composited image. Further, the technology of Patent reference 2 is disadvantageous in that it does not take pitch change into consideration.

Figure 18:
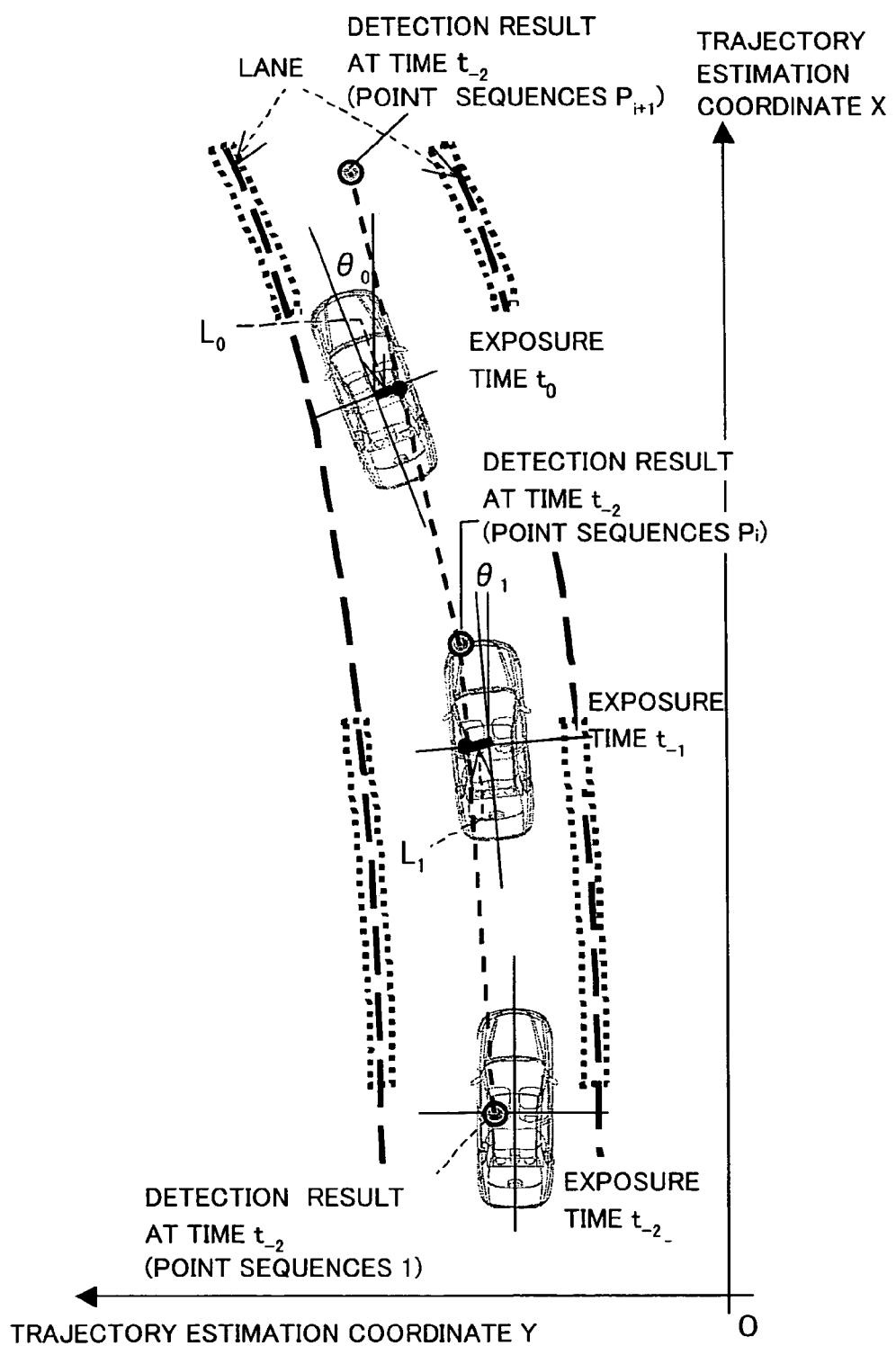
FIG. 18 is an explanatory view showing, as photographed by a camera, changes in the position and posture (angle) of the vehicle relative to a traffic lane marking line (lane), i.e., from exposure time $t_{-2}$ through time $t_{-1}$ up to time $t_0$ to explain horizontal pixel correction processing shown in FIG. 8.

FIG. 18 is an explanatory diagram showing, as taken by the camera 10, changes in the position and posture (angle) of the vehicle 12 relative to a traffic lane marking line (lane), i.e., from exposure time $t_{-2}$ through time $t_{-1}$ up to time $t_0$. Here, exposure time $t_0$ is the present time point, time $t_{-1}$ is the earlier time point, and time $t_{-2}$ is the image-photographing time point of the image used for compositing the images taken at time $t_0$ and $t_{-1}$ and is farther in the past than the time of the earlier time point $t_{-1}$.

In this embodiment, the traffic lane marking lines on the left and right of the vehicle 12 in FIG. 18 (the lane) are recognized, and taking the center thereof as the reference point, the point sequences that are continuums of these points and the line segments connecting them (short broken lines in FIG. 18) are detected and used as lines along which the vehicle is to travel in the case of, for example, lane keep assist control. Note that since the traffic lane marking lines in FIG. 18 are ones obtained by image photographing at the earlier time point (time $t_{-2}$), the point sequences are also the point sequences at time $t_{-2}$. The distances between point sequences and vehicle positions (distances between the traffic lane marking lines and the vehicle 12) in the vehicle positions at exposure times $t_0$, $t_{-1}$ are designated $L_0$ and $L_1$ and the angle between the line segments connecting the point sequences and direction of the vehicle 12 (the fore-aft direction angle of the vehicle 12 along the traffic lane marking lines) as $\theta_0$ and $\theta_1$.

In order to composite the image photographed and memorized at exposure time $t_{-1}$, which is the earlier time point, with the image photographed at the present time point, i.e., the exposure time $t_0$, taking the traffic lane marking lines (lane), point sequences and line segments obtained at exposure time $t_{-2}$ as the references, the distances $L_0$, $L_1$ and angles $\theta_0$, $\theta_1$ are determined, the deviations or changes between $L_0$ and $L_1$ and between $\theta_0$ and $\theta_1$ are determined, and once the changes in the photographed images caused by the changes in the relative position and angle of the vehicle 12 relative to the traffic lane marking lines between times $t_0$ and $t_{-1}$ have been corrected, the images at the two time points are composited.

FIG. 19 is a subroutine flowchart of the horizontal pixel correction processing of S106 of FIG. 8.

This figure shows the processing for determining the lateral position deviation between exposure times $t_0$ and $t_{-1}$ (amount of past (time $t_{-1}$) lateral vehicle movement relative to present time $t_0$) $\Delta L$ and the angle deviation relative to the traffic lane marking lines or the reference line therebetween (past (time $t_{-1}$) angle deviation relative to present time $t_0$) $\Delta \theta$, and then determining the amount of horizontal (lateral) pixel position correction in the images from the determined deviations.

Although the details will be explained below, in S300, the deviations $\Delta L$, $\Delta \theta$ are determined, and in S302 the pixel position correction amount on the image plane at compositing is determined from the deviations $\Delta L$, $\Delta \theta$, and correlation of the camera coordinate system (U, V) and the actual plane coordinate system (X, Y) is performed as pre-compositing hardware-based processing. This processing of S302 will be explained in detail below.

FIG. 20 is a subroutine flowchart of the vertical row correction processing of S108 of FIG. 8.

First, in S400, the pitch direction change $\Delta \theta$pit between exposure times $t_0$ and $t_{-1}$ is determined, and in S402 the amount of vertical row position correction in the image plane at the time of composition is determined based on the change thereof, and correlation of the camera coordinate system (U, V) and the actual plane coordinate system (X, Y) is also performed as pre-compositing hardware-based processing.

Figure 22:
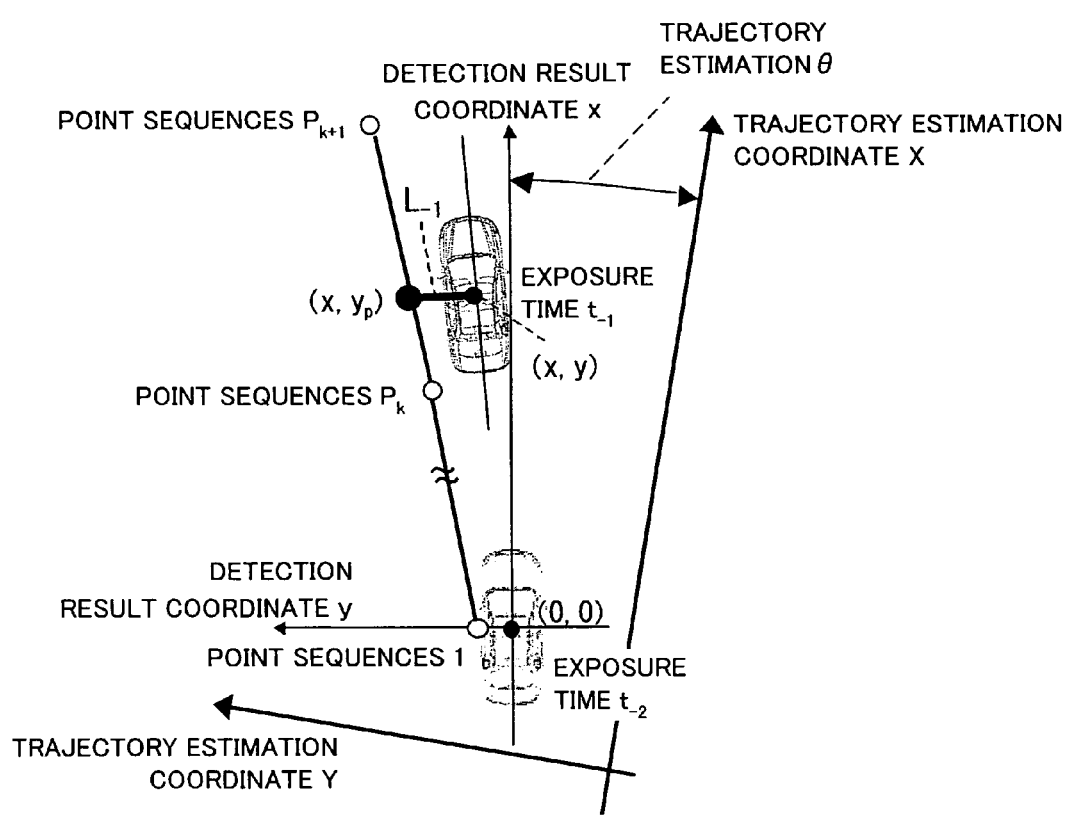
FIG. 22 is an explanatory view showing the processing of FIG. 21.
Figure 23:
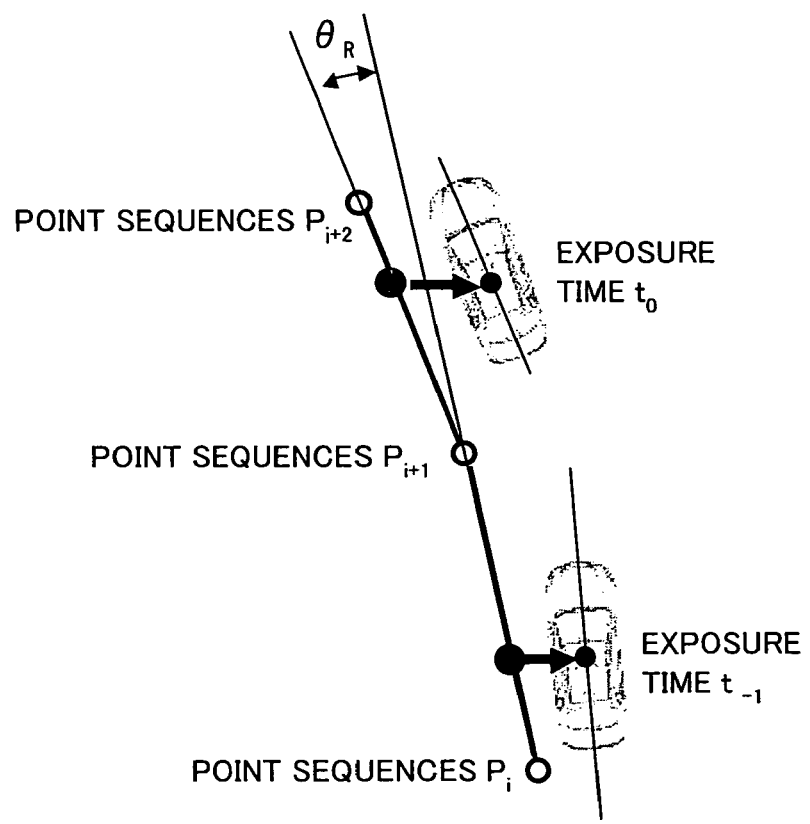
FIG. 23 is an explanatory view similarly showing the processing of FIG. 21.

FIG. 21 is a subroutine flowchart of the processing of S300 in FIG. 19, and FIGS. 22 and 23 are explanatory diagrams thereof.

Explanation will be made with reference to FIGS. 21 to 23. In FIG. 22, the coordinate axes for trajectory estimation are coordinate axes whose X axis is set to the fore-aft-direction center axis of the vehicle (vehicle center axis) at a given time in the past. In order to determine the lateral or horizontal direction change in the position of the vehicle at exposure time $t_{-1}$ in this coordinate system, taking the vehicle position at exposure time $t_{-2}$ as the reference, consideration is given to a detection result coordinate system X, Y whose origin (x, y)=(0, 0) is set at the vehicle (center) position at exposure time $t_{-2}$ and whose X axis is set to the vehicle center axis direction (fore-aft direction).

The position and direction of the vehicle 12 at exposure time $t_{-1}$ are converted into values on the time $t_{-2}$-based X, Y coordinate system using the estimated trajectory (locus) of the vehicle between exposure times $t_0$ and $t_{-1}$ determined from the outputs of the wheel-speed sensor 32 and the yaw rate sensor 34. At this time, the coordinates of the position of the vehicle 12 on the detection result coordinate system X, Y at exposure time $t_{-1}$ are (x, y). In (1) of S500 in FIG. 21, the coordinates (x, y) of the position of the vehicle at exposure time $t_{-1}$ are determined.

In (2) of S500, as shown in FIG. 22, the distance $L_{-1}$ between point (x, $y_p$) directly sideways from the coordinates (x, y), i.e., the same value in the X axis and directly sideways from the coordinates (x, y) on the straight line connecting the point sequences $P_k$, $P_{k+1}$ (at which point the vehicle is positioned at exposure time $t_{-1}$) among the point sequences 1, $P_k$, $P_{k+1}$ that were determined at exposure time $t_{-2}$, and the aforesaid coordinates (x, y) is determined by subtraction as $L_{-1} = y_p - y$.

Similarly, in (3) of S500, the distance $L_0$ between the vehicle position at exposure time $t_0$ and the straight line connecting the point sequences is determined taking exposure time $t_{-2}$ as the reference. Note that in the interest of simplicity, the vehicle position at exposure time $t_0$, point sequence $P_{k+2}$, and so on are omitted in FIG. 22.

Then, in (4) of S500, the lateral direction position deviation $\Delta L$ between exposure times $t_0$ and $t_{-1}$ is determined by the subtraction as $L_0 - L_{-1}$. The sign of $\Delta L$ of course becomes positive or negative depending on the vehicle position at the exposure time points.

Next, the angle deviation $\Delta \theta$ of the vehicle relative to the reference line between exposure times $t_0$ and $t_{-1}$, i.e., the point sequences and the straight line connecting them, is determined.

First, in (1) of S502 in FIG. 21, as shown in FIG. 23, the angle deviation in the trajectory estimation coordinate system shown in FIG. 22 can be determined from difference in the estimated trajectory values $\theta$ at exposure time $t_{-1}$ and exposure time $t_0$. That is, the angular deviation is determined as $\theta_0 - \theta_{-1}$, when defining the estimated trajectory value $\theta$ in the trajectory estimation coordinate system at exposure time $t_0$ as $\theta_0$ and the estimated trajectory value at exposure time $t_{-1}$ as $\theta_{-1}$.

Further, when the straight lines, determined at exposure time $t_{-2}$, connecting the point sequences $P_i$, $P_{i+1}$, $P_{i+2}$ where the vehicle is positioned at two times, i.e., exposure times $t_0$ and $t_{-1}$, differ so that the straight lines are not a single straight line, it is necessary to determine the angle deviation $\theta_R$ between the straight lines, as shown in FIG. 23. Of course if the straight lines are a single straight line or the vehicle position at the two time points is within the range of the same straight line, the angle deviation $\theta_R = 0$.

In (2) of S502 in FIG. 21, the point sequence photographed and detected at exposure time $t_{-2}$ is used to determine the angle deviation OR of the straight line where the vehicle is positioned at exposure times $t_{-1}$, $t_0$. Then in (3) of S502, the angle deviation $\Delta \theta$ is calculated as $\Delta \theta = \theta_0 - \theta_{-1} - \theta_R$.

Figure 24:
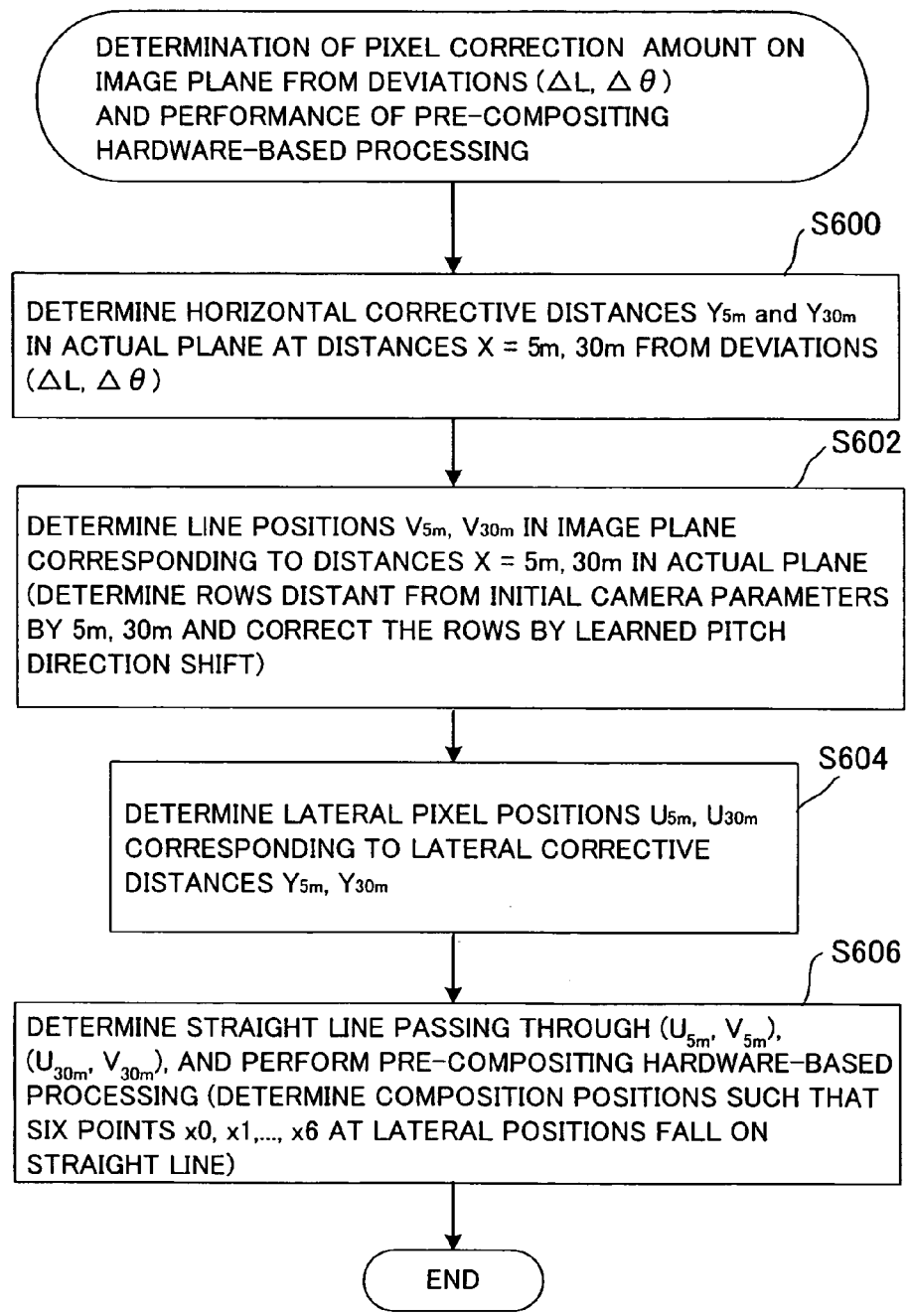
FIG. 24 is a subroutine flowchart of the processing of FIG. 19.
Figure 25:
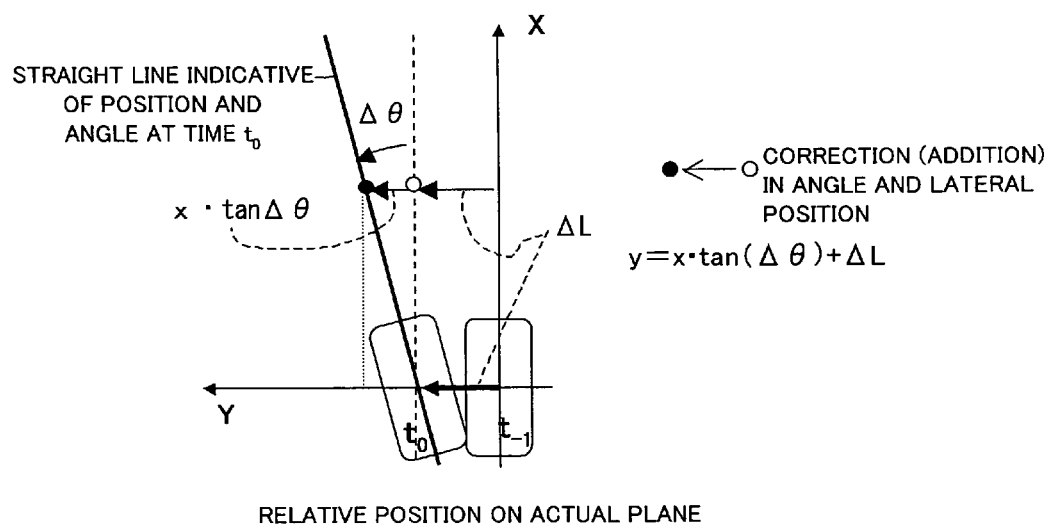
FIG. 25 is an explanatory view showing the processing of FIG. 24.
Figure 26:
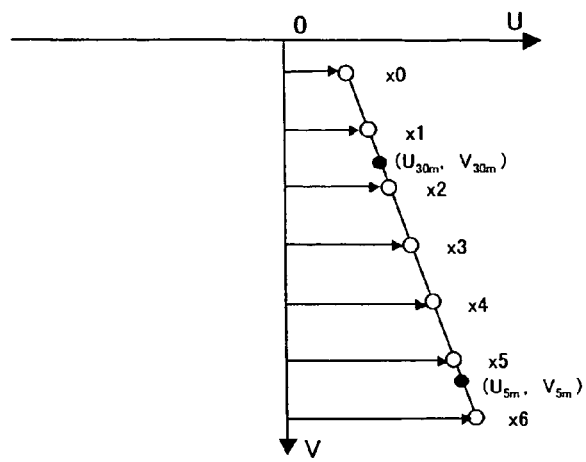
FIG. 26 is an explanatory view similarly showing the processing of FIG. 24.

FIG. 24 is a subroutine flowchart showing the processing of S302 in FIG. 19 and FIGS. 25 and 26 are explanatory diagrams thereof.

FIG. 25 is what is obtained by simplifying and depicting the relationship of times $t_{-1}$ and $t_0$ with the vehicle on the basis of the position deviation $\Delta L$ and angle deviation $\Delta \theta$ relative to the reference line determined earlier in FIGS. 21 and 22. The relationship between the distance in the vehicle fore-aft direction in the actual plane's coordinate system, i.e. the lateral distance Y at X and a given X, is, from $\Delta \theta$ and $\Delta L$, $y = x \cdot \tan \Delta\theta + \Delta L.$ In S600 of FIG. 24, the corrective distances $Y_{5m}$ and $Y_{30m}$ required during horizontal direction compositing in the actual plane at distances X=5 meters and X=30 meters are determined from the above-mentioned equation. Here, 5 meters and 30 meters are examples and can be appropriately defined from the breadth of the photographic range of the camera, and the like.

Next, in S602, the line positions $V_{5m}$ and $V_{30m}$ in the image plane corresponding to the distances X=5 m and X=30 m in the actual plane are determined. The image plane coordinate system is shown in FIG. 26. The V axis corresponds to the distance direction X axis in the actual plane, the top in the vertical direction is made the origin, and the U axis corresponds to the lateral or horizontal Y axis. These line positions $V_{5m}$ and $V_{30m}$ are determined with consideration to the corrected value obtained by learning the pitch direction shift explained in S104 of FIG. 8.

Next, in S604, the lateral pixel positions $U_{5m}$ and $U_{30m}$ in the image plane that correspond to the lateral corrective distances $Y_{5m}$ and $Y_{30m}$ obtained in S600 are determined.

Next, in S606, the straight line passing through the two points of the image plane coordinates (U5 m, V5 m) and (U30 m, V30 m) obtained in S606 is determined. In this embodiment, the composition positions at the time of compositing images photographed at different time points are determined such that six points x0, x1, . . . , x6 on the V axis of the image plane fall on this straight line. That is, in order to correct the position and angle change relative to the reference line in the actual plane at time points $t_{-1}$, $t_0$, the straight line indicating the position and angle of the vehicle at time $t_{-1}$ in the actual plane (coincident with the X axis as the reference) is made equal to the straight line indicating the position and angle at time $t_0$ shown in FIG. 25. Note that this determination of the compositing position can be rapidly processed because it is processed in the hardware-implemented image processing IC.

Figure 27:
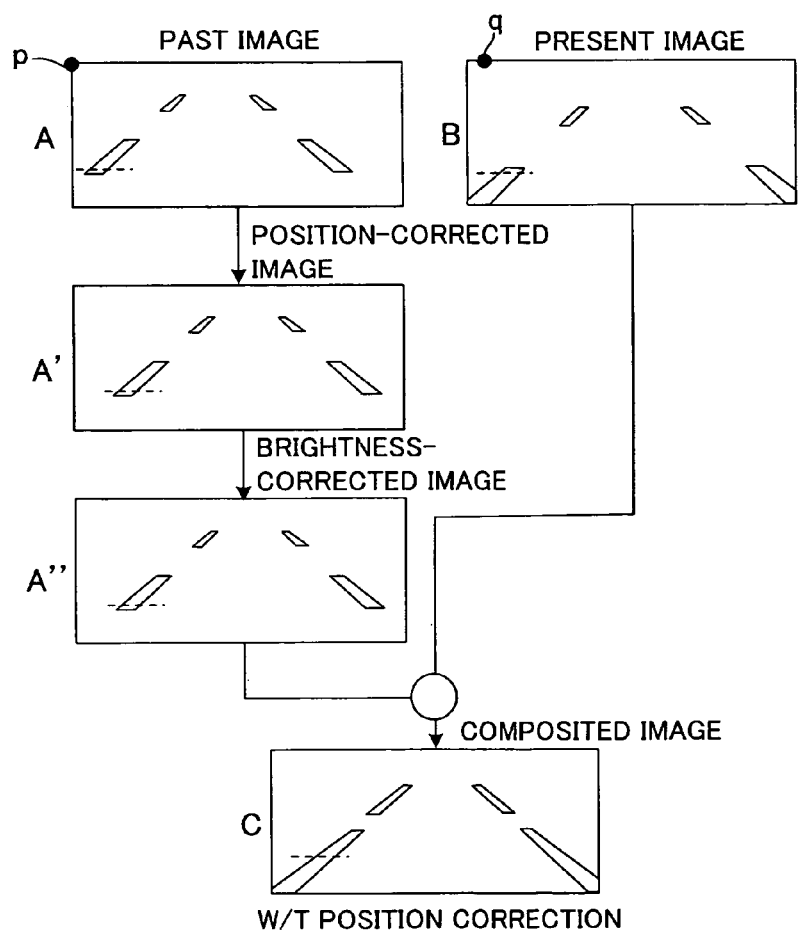
FIG. 27 is an explanatory view showing a composited image imparted with position correction processing shown in FIG. 8.
Figure 28:
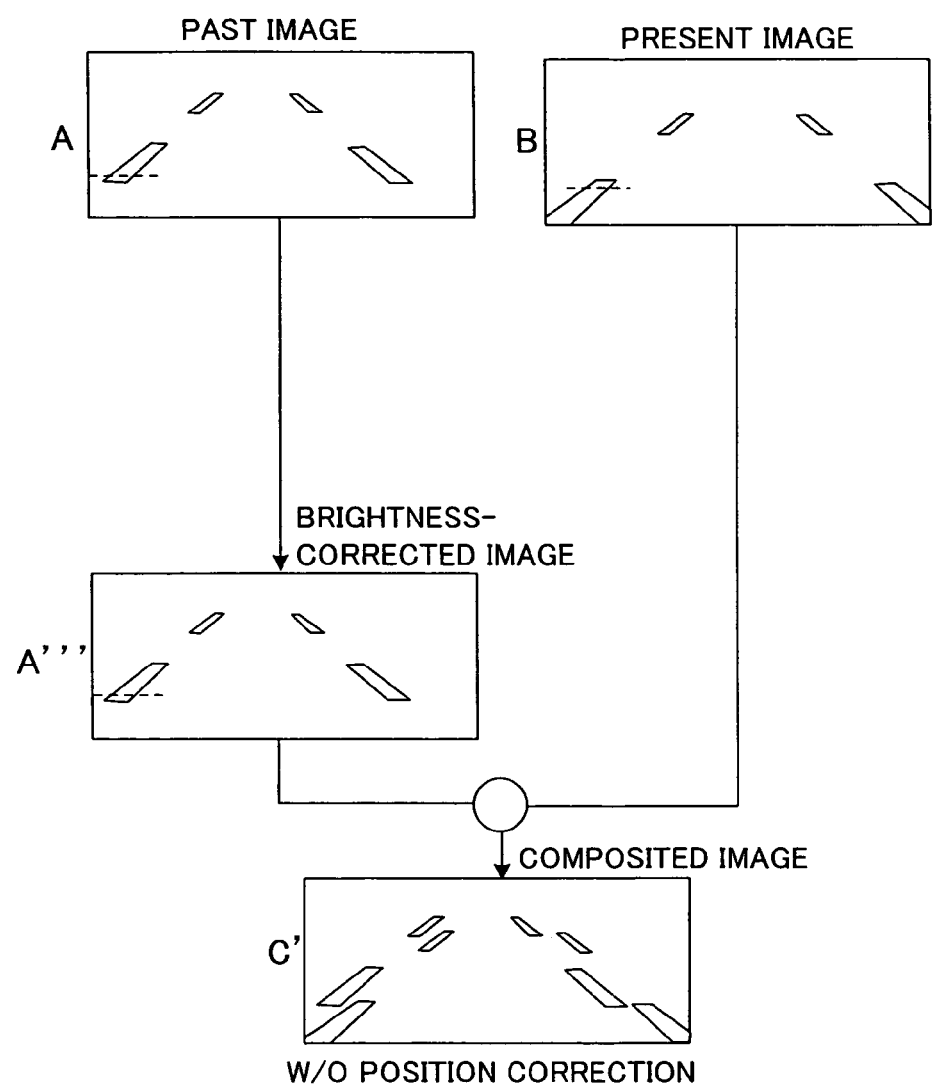
FIG. 28 is an explanatory view showing a composited image in the case of not imparting the position correction processing shown in FIG. 8.

FIGS. 27 and 28 are diagrams showing image-composited images imparted with the position correction processing of this embodiment and image-composited images in the case of not imparting the position correction.

When vehicle lateral direction position and angle correction relative to the traffic lane marking lines is imparted, as in FIG. 27, the traffic lane marking lines assume an elongated form as shown in image C of the same figure, while when correction is not imparted, it can be seen that, as in FIG. 28, the traffic lane marking lines photographed at the earlier and present time points are composited in an offset form and the traffic lane marking lines are not elongated.

In this embodiment, the fore-aft direction angles θ of the vehicle 12 relative to the traffic lane marking lines and the distances L between the traffic lane marking lines and the vehicle 12 in multiple photographed images are determined, the angle and position deviations ($\Delta\theta$, $\Delta L$) between the respective photographed images are determined, and the multiple images are composited after having been corrected such that the angle and distance of the vehicle relative to the traffic lane marking line are equal to each other in the images based on the determined angle and position deviations, whereby the traffic lane marking lines can be reliably elongated in appearance in the composited image.

Further, the pitch angles of the vehicle 12 at image-photographing time points $t_{-1}$ and $t_0$ of multiple photographed images are detected to determine the pitch angle change ($\Delta\theta$-pit) between the photographed images, and the multiple images are composited after being corrected such that the pitch angles are equal to each other in the images based on the determined pitch angle change, whereby the traffic lane marking lines can be still more reliably elongated in appearance.

Note that, instead of the foregoing, it is acceptable to composite by adjusting the compositing positions between the multiple images based on the ascertained angle and position deviations to the condition of being photographed at the same vehicle angle and position relative to the traffic lane marking lines. That is, rather than move the images themselves as set out in the foregoing, it is acceptable to adjust the compositing positions (superimposition positions).

To explain with reference to FIG. 27, if one or the other of the earlier acquired image A and the presently acquired image B is itself shifted by the amount of the aforesaid deviations in lateral direction position and angle between the two time points and superimposed on and composited with the other image, the same result as that of the aforesaid correction is obtained. That is, considering the correction of the lateral direction position, it suffices to make point q of image B in FIG. 27, which is laterally offset from point p of image A by the amount of the lateral direction position correction, fall on point p. Although there is almost no change in angle between the two time points, when there is an angle change, it suffices to composite after the image is rotated in accordance with the amount of angle change. Further, also in a case where there is a pitch angle change, it suffices to composite by shifting one of the images in the vertical direction of FIG. 27 by an amount corresponding to the change. By doing this, the same effect as that of the aforesaid image correction can be obtained.

In this embodiment, the fourth characterizing feature is that in the composition processing of S110 in FIG. 8, the present time point and earlier time point images are composited at the original image stage before edge detection processing.

Figure 29:
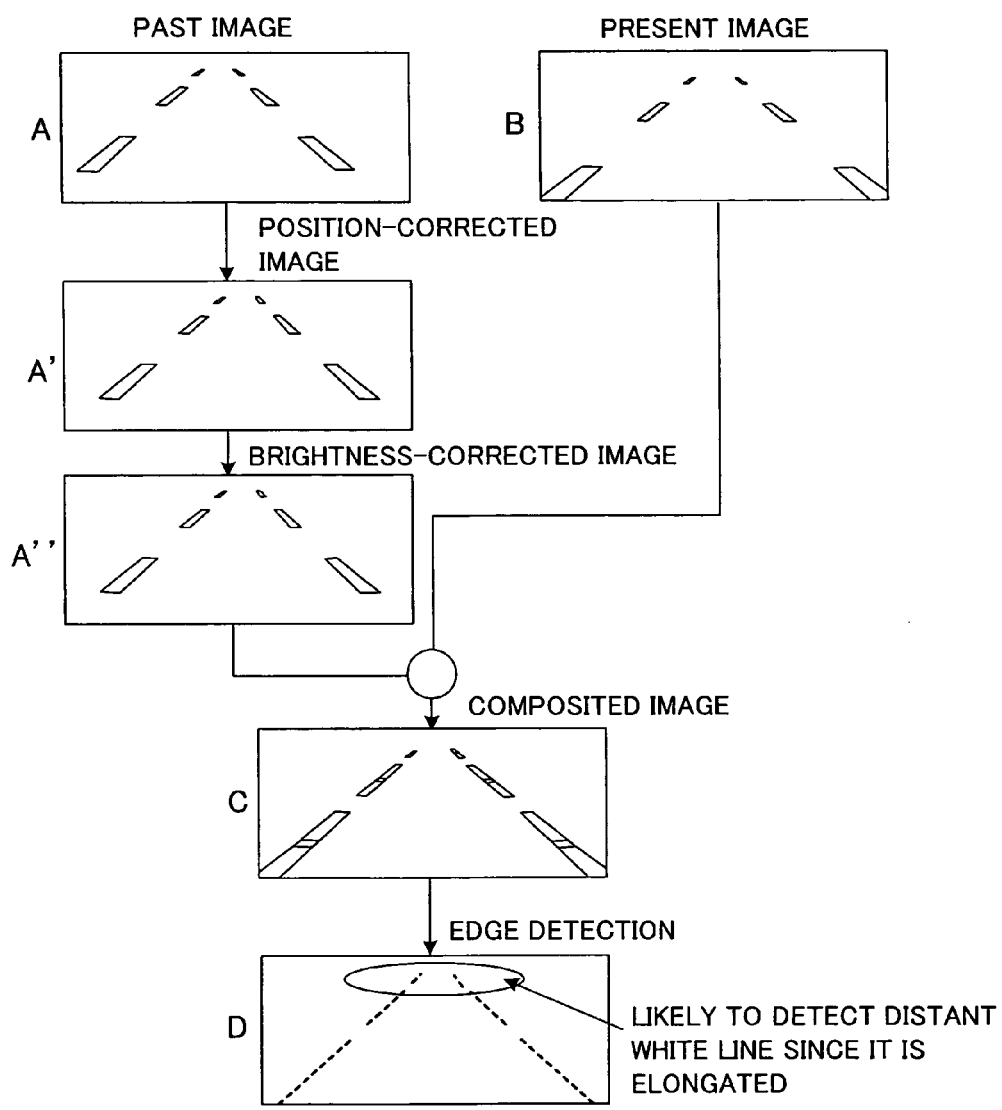
FIG. 29 is an explanatory view showing an image in the case where the composition is conducted prior to conducting edge detection processing in the composition processing of FIG. 8.

This will be explained: FIG. 29 shows images prior to conducting edge detection processing, in other words in the case where the present time point and earlier time point images are composited at the original image stage, and FIG. 30 shows images after conducting edge detection processing, in other words in the case where composition of the present time point and earlier time point is conducted in the so-called edge-image condition as in prior art of Patent Reference 2.

Figure 30:
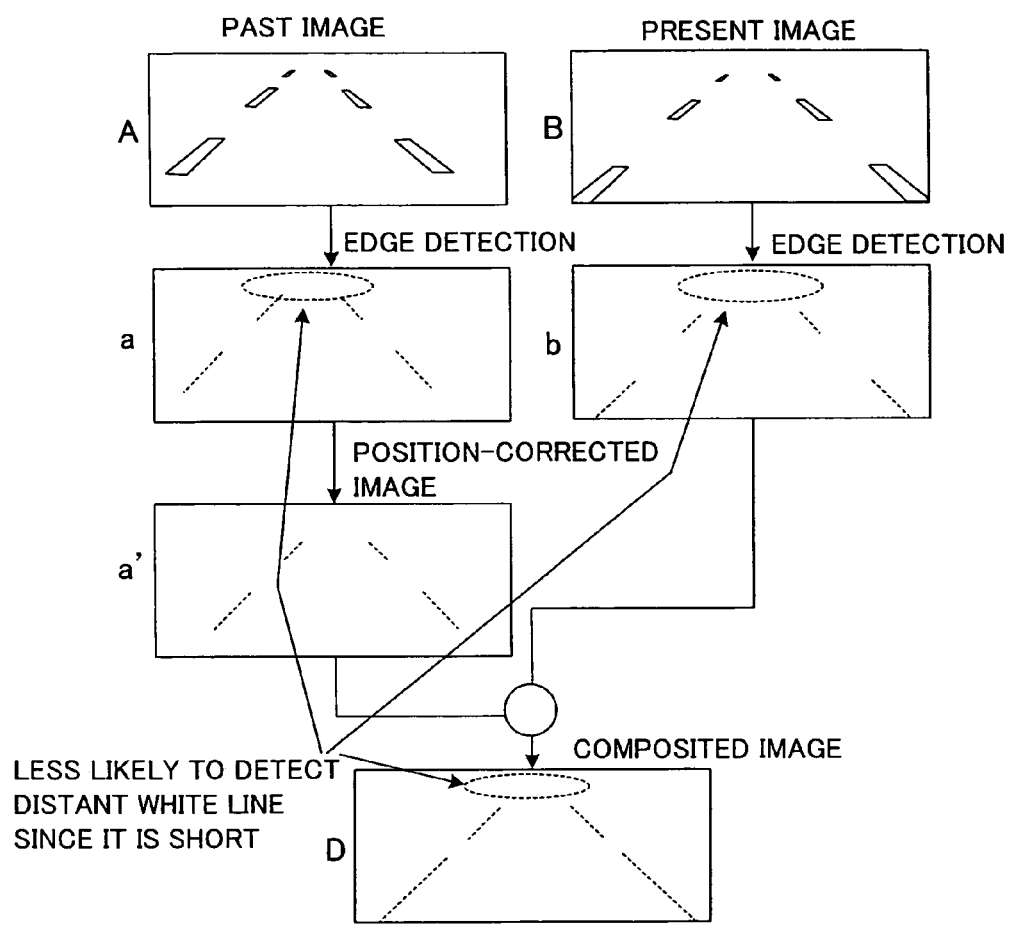
FIG. 30 is an explanatory view showing an image in the case where the composition is conducted after conducting edge detection processing in the prior art.

In the prior art processing of FIG. 30, as in images A, B thereof, the length of the traffic lane marking lines far distant from the subject vehicle is short in the images, i.e., when the present time point and earlier time point images are edge-detection-processed individually, they are not recognized as edges because the size in the images is small, and as a result, as in images a, b of FIG. 30, a condition of there being nothing at all in the far distance of the edge image arises as shown enclosed by a broken line.

Next position correction processing is performed based on the vehicle posture change to obtain the position-corrected image shown in image a' in FIG. 30, and even if the present time point and earlier time point edge images are then composited, the result has no edges corresponding to far distant traffic lane marking lines visible in the original images, as in the region enclosed by a broken line in image D of FIG. 30.

In contrast to this, as shown in FIG. 29, in the case where the earlier time point image (image A in FIG. 29) is position-corrected based on the vehicle posture change (image A' in FIG. 29) and image brightness correction is performed (image A" in FIG. 29), and the present time point and earlier time point images are composited at the original image stage prior to performing edge detection processing, the short traffic lane marking lines in the far distance in the respective original images are elongated and become long, as in image C in FIG. 29, and even if edge detection processing is performed thereafter, can be detected as edges, as in the region enclosed by a solid line in image D of FIG. 29.

Thus, in this embodiment, the configuration is adopted such that the photographed images are composited in a processing stage in such a manner that no change will be imparted to at least the shape of the traffic lane marking lines in the photographed image in the traffic lane marking line recognition processing, more specifically, prior to or before the processing of edge detection, i.e., such that the present time point and earlier time point images are composited at the original image stage prior to edge detection processing, so that distant traffic lane marking lines can be detected, thereby making it possible to extend the traffic lane marking lines in appearance and improve recognition accuracy.

Note that although it has been defined as being before edge detection processing, it suffices for the shape and profile of the traffic lane marking lines in the photographed original images to be in a retained condition and since, as has been mentioned above, edge detection processing is ordinarily constituted of differentiation processing, binarization processing and edge detection, the effect of the present invention can be obtained if compositing is done before binarization processing even if not before edge detection processing, i.e., before differentiation processing.

Figure 31:
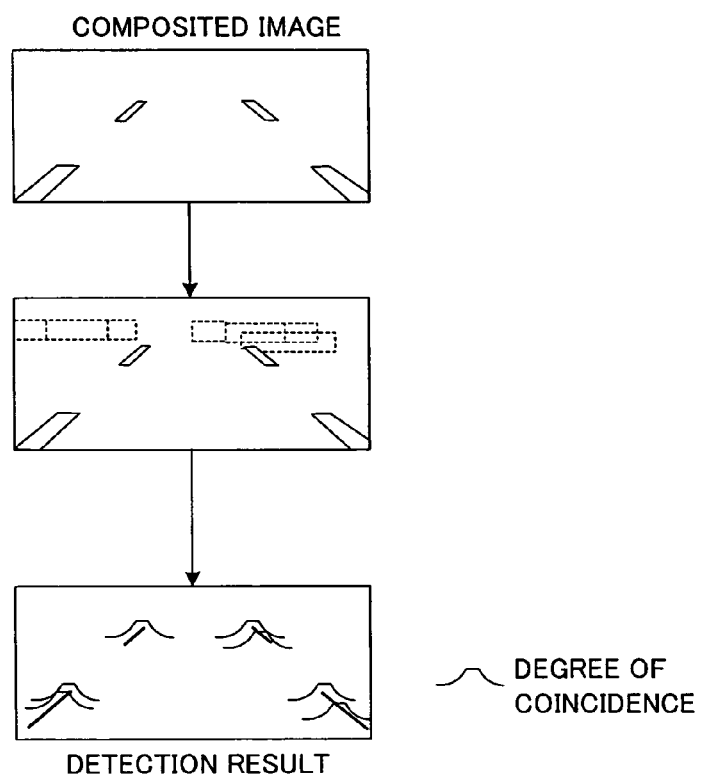
FIG. 31 is an explanatory view showing a pattern matching method that can be used instead of the edge detection processing or Hough transformation.

Note that although this invention has been explained taking traffic lane marking line recognition by edge detection processing and Hough transformation as an example, this invention is not limited thereto and by elongating the traffic lane marking line segments with respect to another method, e.g., a method using pattern matching such as shown in FIG. 31 or set out Japanese Laid-Open Patent Application No. Hei 8(1996)-297728, more accurate pattern matching is possible, which is effective. Such pattern matching is shown in FIG. 32.

Figure 32:
FIG. 32 is an explanatory view showing an example of the pattern matching method shown in FIG. 31.

That is, a method is known wherein the traffic lane marking lines are established beforehand by defining shape patterns in an image photographed by an on-board camera as multiple templates such as shown in FIG. 32, sequentially applying these to the photographed image as shown in the middle diagram of FIG. 31, determining the degree of coincidence of the image and templates, and, as in the bottom diagram of FIG. 31, and, from the coincidence degree distribution, defining the lines formed by the points with the highest degree of coincidence as the traffic lane marking lines; and also in such pattern matching, the present invention can elongate the traffic lane marking lines to improve the recognition accuracy of the traffic lane marking lines.

Further, in this embodiment, although the number of images to be composited in the processing of S100 is two, it can as necessary be a larger plural number. In addition, in this embodiment, selection is made in accordance with vehicle speed from among images periodically photographed, but it also acceptable, for example, to provide two or more image photographing means and select in accordance with the vehicle speed from among images not photographed in the same common cycle.

Further, in the correction of S108, it is acceptable to make the correction by, instead of using the change in the horizon obtained from the images, installing a pitch angle sensor at an appropriate location of the vehicle 12 and determining dynamic offset from the output thereof.

Further, although a configuration is adopted whereby the camera 10 photographs a range including the road surface ahead of the vehicle, it is of course acceptable to adopt a configuration provided with an image photographing means (camera) for photographing a range including the road surface behind the vehicle when the vehicle 12 is traveling forward, wherein the traffic lane marking lines behind the vehicle are recognized from the photographed images taken by the image photographing means. Therefore, in this specification "direction of travel of the vehicle" is used to mean the fore-aft direction of the vehicle.

As stated above, the embodiment is thus configured to have a system for recognizing a traffic lane marking line for a vehicle 12 comprising image photographing means (camera 10, image processing ECU 44) for photographing a range including a road surface in a direction of travel of the vehicle, traffic lane marking line recognizing means (image processing ECU 44, S12 to S16) configured to be capable of recognizing at least a traffic lane marking line in a broken line on the road surface in a photographed image photographed by the image photographing means, image compositing means (image processing ECU 44, S12, S100 to S110) for compositing a plurality of images photographed at different time points by the image photographing means to elongate the traffic lane marking line in the photographed images, and vehicle condition detecting means (S106 to S108, S300, S302, S400, S402) for detecting a fore-aft direction angle of the vehicle relative to the traffic lane marking line θ and a distance of the vehicle from the traffic lane marking line L in the plurality of images to be composited by the image compositing means and determining deviations of the angles and distances Δθ, ΔL between the plurality of the images. The image compositing means composites the plurality of images, after correcting the plurality of images such that the angles and distances of the vehicle relative to the traffic lane marking line are equal to each other in the plurality of images based on the deviations of the angles and distances determined by the vehicle condition detecting means (S110).

Further, the embodiment is configured to have a system for recognizing a traffic lane marking line for a vehicle 12 having image photographing means (camera 10, image processing ECU 44) for photographing a range including a road surface in a direction of travel of the vehicle, traffic lane marking line recognizing means (image processing ECU 44, S12 to S16) configured to be capable of recognizing at least a traffic lane marking line in a broken line on the road surface in a photographed image photographed by the image photographing means, image compositing means (image processing ECU 44, S12, S100 to S110) for compositing a plurality of images photographed at different time points by the image photographing means to elongate the traffic lane marking line in the photographed images, and vehicle condition detecting means (S106 to S108, S300, S302, S400, S402) for detecting a fore-aft direction angle of the vehicle relative to the traffic lane marking line θ and a distance of the vehicle from the traffic lane marking line L in the plurality of images to be composited by the image compositing means and determining deviations of the angles and distances Δθ, ΔL between the plurality of the images. The image compositing means composites the plurality of images, by adjusting a compositing position of the plurality of images, such that the angles and distances of the vehicle relative to the traffic lane marking line are equal to each other in the plurality of images based on the deviations of the angles and distances determined by the vehicle condition detecting means (S110).

Further, the embodiment is configured to further include: pitch angle change detecting means (S106 to S108, S400, S402) for detecting a pitch angle of the vehicle θpit at each of the time points where the plurality of images are photographed to determine a change in the pitch angle Δθpit in the images; and the image compositing means composites the plurality of images, after correcting the plurality of images such that the pitch angles are equal to each other in the plurality of images based on the change in the pitch angle determined by the pitch angle change detecting means (S110).

Further, the embodiment is configured to further include: pitch angle change detecting means (S106 to S108, S400, S402) for detecting a pitch angle of the vehicle θpit at each of the time points where the plurality of images are photographed to determine a change in the pitch angle Δθpit in the images; and the image compositing means composites the plurality of images, by adjusting a compositing position of the plurality of images, such that the pitch angles are equal to each other in the plurality of images based on the change in the pitch angle determined by the pitch angle change detecting means (S110).

INDUSTRIAL APPLICABILITY

According to this invention, since it is configured such that the fore-aft direction angles of a vehicle relative to traffic lane marking lines and the distances between the traffic lane marking lines and the vehicle in multiple photographed images to be composited are determined, the deviations therein between the respective images are determined, and the images are composited after having been corrected such that the angle and distance of the vehicle relative to the traffic lane marking line are equal to each other in the images based on the determined angle and position deviations, the traffic lane marking lines can be reliably elongated in appearance in the composited image so as to improve traffic lane marking line recognition accuracy, whereby a traffic lane marking line recognition system is provided for vehicles that can unerringly recognize the subject vehicle's traffic lane.

Although there have been described what are the present exemplary embodiments of the invention, it will be understood that variations and modifications may be made thereto within the spirit and scope of the appended claims.

The invention claimed is:

1. A system for recognizing a traffic lane marking line for a vehicle comprising:
   image photographing means for photographing a range including a road surface in a direction of travel of the vehicle;
   traffic lane marking line recognizing means configured to be capable of recognizing at least a traffic lane marking line in a broken line on the road surface in a photographed image photographed by the image photographing means;
   image compositing means for compositing a plurality of images photographed at different time points by the image photographing means to elongate the traffic lane marking line in the photographed images; and
   vehicle condition detecting means for detecting a fore-aft direction angle of the vehicle relative to the traffic lane marking line and a distance of the vehicle from the traffic lane marking line in the plurality of images to be composited by the image compositing means and determining deviations of the angles and distances between the plurality of the images;
   wherein the image compositing means composites the plurality of images, after correcting the plurality of images such that the angles and distances of the vehicle relative to the traffic lane marking line are equal to each other in the plurality of images based on the deviations of the angles and distances determined by the vehicle condition detecting means.

2. The system according to claim 1, further comprising:
   pitch angle change detecting means for detecting a pitch angle of the vehicle at each of the time points where the plurality of images are photographed to determine a change in the pitch angle in the images; and
   the image compositing means composites the plurality of images, after correcting the plurality of images such that the pitch angles are equal to each other in the plurality of images based on the change in the pitch angle determined by the pitch angle change detecting means.

3. A system for recognizing a traffic lane marking line for a vehicle comprising:
   image photographing means for photographing a range including a road surface in a direction of travel of the vehicle;
   traffic lane marking line recognizing means configured to be capable of recognizing at least a traffic lane marking line in a broken line on the road surface in a photographed image photographed by the image photographing means;
   image compositing means for compositing a plurality of images photographed at different time points by the image photographing means to elongate the traffic lane marking line in the photographed images; and
   vehicle condition detecting means for detecting a fore-aft direction angle of the vehicle relative to the traffic lane marking line and a distance of the vehicle from the traffic lane marking line in the plurality of images to be composited by the image compositing means and determining deviations of the angles and distances between the plurality of the images;
   wherein the image compositing means composites the plurality of images, by adjusting a compositing position of the plurality of images, such that the angles and distances of the vehicle relative to the traffic lane marking line are equal to each other in the plurality of images based on the deviations of the angles and distances determined by the vehicle condition detecting means.

4. The system according to claim 3, further comprising:
   pitch angle change detecting means for detecting a pitch angle of the vehicle at each of the time points where the plurality of images are photographed to determine a change in the pitch angle in the images; and
   the image compositing means composites the plurality of images, by adjusting a compositing position of the plurality of images, such that the pitch angles are equal to each other in the plurality of images based on the change in the pitch angle determined by the pitch angle change detecting means.

5. A vehicle comprising:
   image photographing means for photographing a range including a road surface in a direction of travel of the vehicle;
   traffic lane marking line recognizing means configured to be capable of recognizing at least a traffic lane marking line in a broken line on the road surface in a photographed image photographed by the image photographing means;

image compositing means for compositing a plurality of images photographed at different time points by the image photographing means to elongate the traffic lane marking line in the photographed images; and vehicle condition detecting means for detecting a fore-aft direction angle of the vehicle relative to the traffic lane marking line and a distance of the vehicle from the traffic lane marking line in the plurality of images to be composited by the image compositing means and determining deviations of the angles and distances between the plurality of the images, wherein the image compositing means composites the plurality of images, after correcting the plurality of images such that the angles and distances of the vehicle relative to the traffic lane marking line are equal to each other in the plurality of images based on the deviations of the angles and distances determined by the vehicle condition detecting means.

6. The vehicle according to claim 5, further comprising:

pitch angle change detecting means for detecting a pitch angle of the vehicle at each of the time points where the plurality of images are photographed to determine a change in the pitch angle in the images; and the image compositing means composites the plurality of images, after correcting the plurality of images such that the pitch angles are equal to each other in the plurality of images based on the change in the pitch angle determined by the pitch angle change detecting means.

7. A vehicle comprising:

image photographing means for photographing a range including a road surface in a direction of travel of the vehicle;

traffic lane marking line recognizing means configured to be capable of recognizing at least a traffic lane marking line in a broken line on the road surface in a photographed image photographed by the image photographing means;

image compositing means for compositing a plurality of images photographed at different time points by the image photographing means to elongate the traffic lane marking line in the photographed images; and vehicle condition detecting means for detecting a fore-aft direction angle of the vehicle relative to the traffic lane marking line and a distance of the vehicle from the traffic lane marking line in the plurality of images to be composited by the image compositing means and determining deviations of the angles and distances between the plurality of the images, wherein the image compositing means composites the plurality of images, by adjusting a compositing position of the plurality of images, such that the angles and distances of the vehicle relative to the traffic lane marking line are equal to each other in the plurality of images based on the deviations of the angles and distances determined by the vehicle condition detecting means.

8. The vehicle according to claim 7, further comprising:

pitch angle change detecting means for detecting a pitch angle of the vehicle at each of the time points where the plurality of images are photographed to determine a change in the pitch angle in the images; and the image compositing means composites the plurality of images, by adjusting a compositing position of the plurality of images, such that the pitch angles are equal to each other in the plurality of images based on the change in the pitch angle determined by the pitch angle change detecting means.

* * * * *